(12) United States Patent
Oshimi et al.

(10) Patent No.: US 7,824,629 B2
(45) Date of Patent: Nov. 2, 2010

(54) HONEYCOMB STRUCTURE AND MANUFACTURING METHOD FOR HONEYCOMB STRUCTURE

(75) Inventors: Yukio Oshimi, Gifu (JP); Hiroki Sato, Gifu (JP)

(73) Assignee: Ibiden Co., Ltd., Gifu (JP)

( * ) Notice: Subject to any disclaimer, the term of this patent is extended or adjusted under 35 U.S.C. 154(b) by 1007 days.

(21) Appl. No.: 11/606,199

(22) Filed: Nov. 30, 2006

(65) Prior Publication Data

US 2007/0068128 A1     Mar. 29, 2007

Related U.S. Application Data

(63) Continuation of application No. PCT/JP2006/315371, filed on Aug. 3, 2006.

(30) Foreign Application Priority Data

Aug. 26, 2005 (JP) .............................. 2005-246286

(51) Int. Cl.
  *B01D 50/00* (2006.01)
(52) U.S. Cl. ..................................... 422/180
(58) Field of Classification Search ................. 422/177, 422/179, 180
  See application file for complete search history.

(56) References Cited

U.S. PATENT DOCUMENTS

| | | | |
|---|---|---|---|
| 5,514,446 A | 5/1996 | Machida et al. | |
| 5,914,187 A | 6/1999 | Naruse et al. | |
| 6,669,751 B1 | 12/2003 | Ohno et al. | |
| 7,396,586 B2 | 7/2008 | Ohno et al. | |
| 2004/0055265 A1 | 3/2004 | Ohno et al. | |
| 2004/0161596 A1 | 8/2004 | Taoka et al. | |
| 2005/0076626 A1 | 4/2005 | Kudo et al. | |
| 2005/0109023 A1 | 5/2005 | Kudo et al. | |
| 2005/0153099 A1 | 7/2005 | Yamada | |
| 2005/0160710 A1 | 7/2005 | Taoka et al. | |
| 2005/0161849 A1 | 7/2005 | Ohno et al. | |
| 2005/0169819 A1 | 8/2005 | Shibata | |
| 2005/0175514 A1 | 8/2005 | Ohno | |
| 2005/0178098 A1 | 8/2005 | Ono et al. | |
| 2005/0180898 A1 | 8/2005 | Yamada | |

(Continued)

FOREIGN PATENT DOCUMENTS

EP    1 375 853    1/2004

(Continued)

OTHER PUBLICATIONS

Related case list.

(Continued)

*Primary Examiner*—Tom Duong
(74) *Attorney, Agent, or Firm*—Finnegan, Henderson, Farabow, Garrett & Dunner, L.L.P.

(57) ABSTRACT

A honeycomb structured body includes a plurality of honeycomb members bonded together by a bonding material, including a plurality of first honeycomb members, each having a vertical cross-section that is orthogonal to an axis of the honeycomb structured body and rectangular, and a plurality of second honeycomb members each having a vertical cross-section that is orthogonal to the axis and irregular in shape; and a filing layer arranged between an outer coating layer, which defines an outer surface of the honeycomb structured body, and an outer surface of the filter peripheral portion formed by the plurality of second honeycomb members.

32 Claims, 7 Drawing Sheets

U.S. PATENT DOCUMENTS

| | | |
|---|---|---|
| 2005/0229565 A1 | 10/2005 | Yoshida |
| 2005/0247038 A1 | 11/2005 | Takahashi |
| 2005/0272602 A1 | 12/2005 | Ninomiya |
| 2006/0021310 A1 | 2/2006 | Ohno et al. |
| 2006/0051556 A1 | 3/2006 | Ohno et al. |
| 2006/0166820 A1 | 7/2006 | Ogyu et al. |
| 2006/0210765 A1 | 9/2006 | Ohno et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0230732 A1 | 10/2006 | Kunieda |
| 2007/0020155 A1 | 1/2007 | Ohno et al. |
| 2007/0128405 A1 | 6/2007 | Sakaguchi et al. |
| 2007/0130897 A1 | 6/2007 | Sakaguchi et al. |
| 2007/0169453 A1 | 7/2007 | Hayakawa |
| 2007/0178275 A1 | 8/2007 | Takahashi |
| 2007/0196620 A1 | 8/2007 | Ohno et al. |
| 2007/0293392 A1 | 12/2007 | Ohno et al. |
| 2008/0120950 A1 | 5/2008 | Ohno et al. |
| 2008/0136062 A1 | 6/2008 | Kasai et al. |
| 2008/0174039 A1 | 7/2008 | Saijo et al. |
| 2008/0197544 A1 | 8/2008 | Saijo et al. |
| 2008/0211127 A1 | 9/2008 | Naruse et al. |
| 2008/0213485 A1 | 9/2008 | Shibata |
| 2008/0236115 A1 | 10/2008 | Sakashita |
| 2008/0236724 A1 | 10/2008 | Higuchi |
| 2008/0237942 A1 | 10/2008 | Takamatsu |
| 2008/0241015 A1 | 10/2008 | Kudo et al. |
| 2008/0284067 A1 | 11/2008 | Naruse et al. |
| 2008/0305259 A1 | 12/2008 | Saijo |
| 2008/0318001 A1 | 12/2008 | Sakakibara |
| 2009/0004431 A1 | 1/2009 | Ninomiya |
| 2009/0079111 A1 | 3/2009 | Kasai et al. |
| 2009/0107879 A1 | 4/2009 | Otsuka et al. |
| 2009/0130378 A1 | 5/2009 | Imaeda et al. |
| 2009/0199953 A1 | 8/2009 | Sato |
| 2009/0202402 A1 | 8/2009 | Sato |
| 2009/0220735 A1 | 9/2009 | Mizuno et al. |

FOREIGN PATENT DOCUMENTS

| | | |
|---|---|---|
| EP | 1 440 722 | 7/2004 |
| EP | 1 632 657 | 3/2006 |
| GB | 2 287 661 A | 9/1995 |
| JP | 07-246341 | 9/1995 |
| JP | 3121497 | 10/2000 |
| JP | 2001-162119 | 6/2001 |
| JP | 2001-162119 A | 6/2001 |
| JP | 2003-260322 | 9/2003 |
| JP | 2003-275522 | 9/2003 |
| JP | 2003-275522 A | 9/2003 |
| JP | 2005-125237 | 5/2005 |
| JP | 2005-125237 A1 | 5/2005 |
| JP | 2005-154202 | 6/2005 |
| WO | WO 2005/064128 | 7/2005 |
| WO | WO 2005/102498 | 11/2005 |
| WO | WO 2006/057344 | 1/2006 |
| WO | WO 2006/035822 | 4/2006 |
| WO | WO 2006/035823 | 4/2006 |
| WO | WO 2006/041174 | 4/2006 |
| WO | WO 2006/070504 | 7/2006 |
| WO | WO 2006/082938 | 8/2006 |
| WO | WO 2006/082940 | 8/2006 |
| WO | WO 2006/087932 | 8/2006 |
| WO | WO 2006/117899 | 11/2006 |

OTHER PUBLICATIONS

U.S. Appl. No. 11/712,372.
U.S. Appl. No. 11/760,037.
U.S. Appl. No. 11/927,091.
U.S. Appl. No. 11/874,790.
U.S. Appl. No. 11/581,300.
U.S. Appl. No. 11/925,459.
U.S. Appl. No. 11/932,469.
European Search Report re EP 06 01 7775.
U.S. Appl. No. 11/967,783, to Takamitsu Saijo et al., filed Dec. 31, 2007, (now abandoned).
U.S. Appl. No. 12/029,242, to Shoji Takamatsu, filed Feb. 12, 2008.
U.S. Appl. No. 12/235,296 to Matsuo Otsuka et al., filed Sep. 22, 2008.
U.S. Appl. No. 12/250,633, to Masahi Imaeda et al., filed Oct. 14, 2008.
U.S. Appl. No. 12/029,942, to Shoji Takamatsu, filed Feb. 12, 2008.
U.S. Appl. No. 12/250,633, to Masaki Imaeda et al., filed Oct. 14, 2008.
U.S. Appl. No. 12/369,876, filed Feb. 12, 2009, to Hiroki Sato, entitled "Method For Manufacturing Honeycomb Structure," which claims priority to PCT/JP2008/052375, filed Feb. 13, 2008.
U.S. Appl. No. 12/363,396, filed Jan. 30, 2009, to Hiroki Sato, entitled "Honeycomb Structure, Exhaust Gas Purifying Apparatus and Method For Manufacturing Honeycomb Structure," which claims priority to PCT/JP2008/052374, filed Feb. 13, 2008.
U.S. Appl. No. 12/334,226, filed Dec. 12, 2008, to Hideaki Mizuno et al., entitled "Sealing Material For Honeycomb Structure, Honeycomb Structure and Method For Manufacturing Honeycomb Structure," which claims priority to PCT/JP2008/053638, filed Feb. 29, 2008.
U.S. Appl. No. 12/400,389, to Takehiro Higuchi, entitled "Honeycomb Structure and Method For Manufacturing Honeycomb Structure," which claims priority to PCT/JP2008/055461, filed Mar. 24, 2008.
U.S. Appl. No. 12/342,903, to Kazushige Ohno, entitled "Honeycomb Filter, Exhaust Gas Purifying Apparatus and Method For Manufacturing Honeycomb Filter," which claims priority to PCT/JP2008/055462, filed Dec. 23, 2008.
U.S. Appl. No. 12/393,200, to Takamitsu Saijo, entitled "Method For Manufacturing Honeycomb Structure," which claims priority to PCT/JP2008/055937, filed Mar. 27, 2008.
U.S. Appl. No. 12/411,148, to Yuichi Hiroshima, entitled "Stopping Member, Firing Furnace, and Method For Manufacturing Honeycomb Structure," which claims priority to PCT/JP2008/055938, filed Mar. 27, 2008.
PCT Notification of Transmittal of Translation of the International Preliminary Report on Patentability, dated Sep. 18, 2008 on International Application No. PCT/JP2006/315371 (5 pgs.).

US 7,824,629 B2

HONEYCOMB STRUCTURE AND MANUFACTURING METHOD FOR HONEYCOMB STRUCTURE

CROSS-REFERENCE TO RELATED APPLICATIONS

This non-provisional application is a continuation application of and claims the benefit of International Application No. PCT/JP2006/315371, filed on Aug. 3, 2006, which is based upon and claims the benefit of priority from prior Japanese Patent Application No. 2005-246286, filed on Aug. 26, 2005. The entire contents of both of the prior applications are incorporated herein by reference.

BACKGROUND OF THE INVENTION

The present invention relates to a honeycomb structured body and a manufacturing method for the honeycomb structured body.

In recent years, environmental considerations have increased the necessity for removing particulate matter contained in exhaust gases of combustion apparatuses, such as an internal combustion engine and a boiler. In particular, regulations relating to removing of particulate matter (PM) including graphite particles discharged from diesel engines tend towards tightening in Europe, the United States, and Japan. A honeycomb structured body referred to as a diesel particulate filter (DPF) has been used to capture and remove matters such as PM. A honeycomb structured body is accommodated in a casing that is arranged on an exhaust passage for a combustion apparatus. The honeycomb structured body has a large number of cells that extend in the longitudinal direction of the structure. The cells are partitioned by partitions. In every pair of adjacent cells, one cell has an open end on one side and the other cell has an open end on the opposite side. The opens cells are sealed by plugs. The plugs are arranged in a lattice on each end surface (inlet side end surface and outlet side end surface) of the honeycomb structured body. Exhaust gas enters open cells at the inlet side end surface of the honeycomb structured body, flows through the porous partitions, and is discharged from adjacent open cells at the outlet side end surface. For example, PM discharged from a diesel engine is captured by the partitions that function as a filter, and accumulates on the partitions. The PM accumulating on the partitions is burned and removed by a heating means, such as a burner or a heater, or by the heat of the exhaust gas. In this specification, the burning and removing of PM is also referred to as "removing PM" or "regenerating the honeycomb structured body".

Various honeycomb structured bodies have been known (refer for example to JP-A 2003-260322, JP-B 3121497, and JP-A 2005-154202). The honeycomb structured body described in JP-A 2003-260322 has a circular cross-section and includes reinforced portions arranged at predetermined positions of its outer wall. The predetermined positions on which the reinforced parts are arranged are outer wall positions having a low strength.

The honeycomb structured body described in JP-B 3121497 is formed by a plurality of honeycomb members that are divided by planes parallel to the axis of the honeycomb structured body. More specifically, the honeycomb structured body is formed by eight honeycomb members having rectangular pillar shapes and four honeycomb members having isosceles right triangular cross-sections. The cross-section of the honeycomb structured body is octagonal. A sealing material is interposed between adjacent honeycomb members to integrally bond the honeycomb members.

The honeycomb structured body described in JP-A 2005-154202 has a circular cross-section. This honeycomb structured body is obtained by combining a plurality of honeycomb members having rectangular pillar shapes into a bundle using a sealing material and partially cutting the bundle of the honeycomb members to adjust the outer shape of the bundle.

The entire contents of JP-A 2003-260322, JP-B 3121497, and JP-A 2005-154202 are incorporated herein by reference.

BRIEF DESCRIPTION OF THE DRAWINGS

The invention, together with objects and advantages thereof, may best be understood by reference to the following description of the presently preferred embodiments together with the accompanying drawings in which.

BEST MODE FOR CARRYING OUT THE INVENTION

Figure 1:
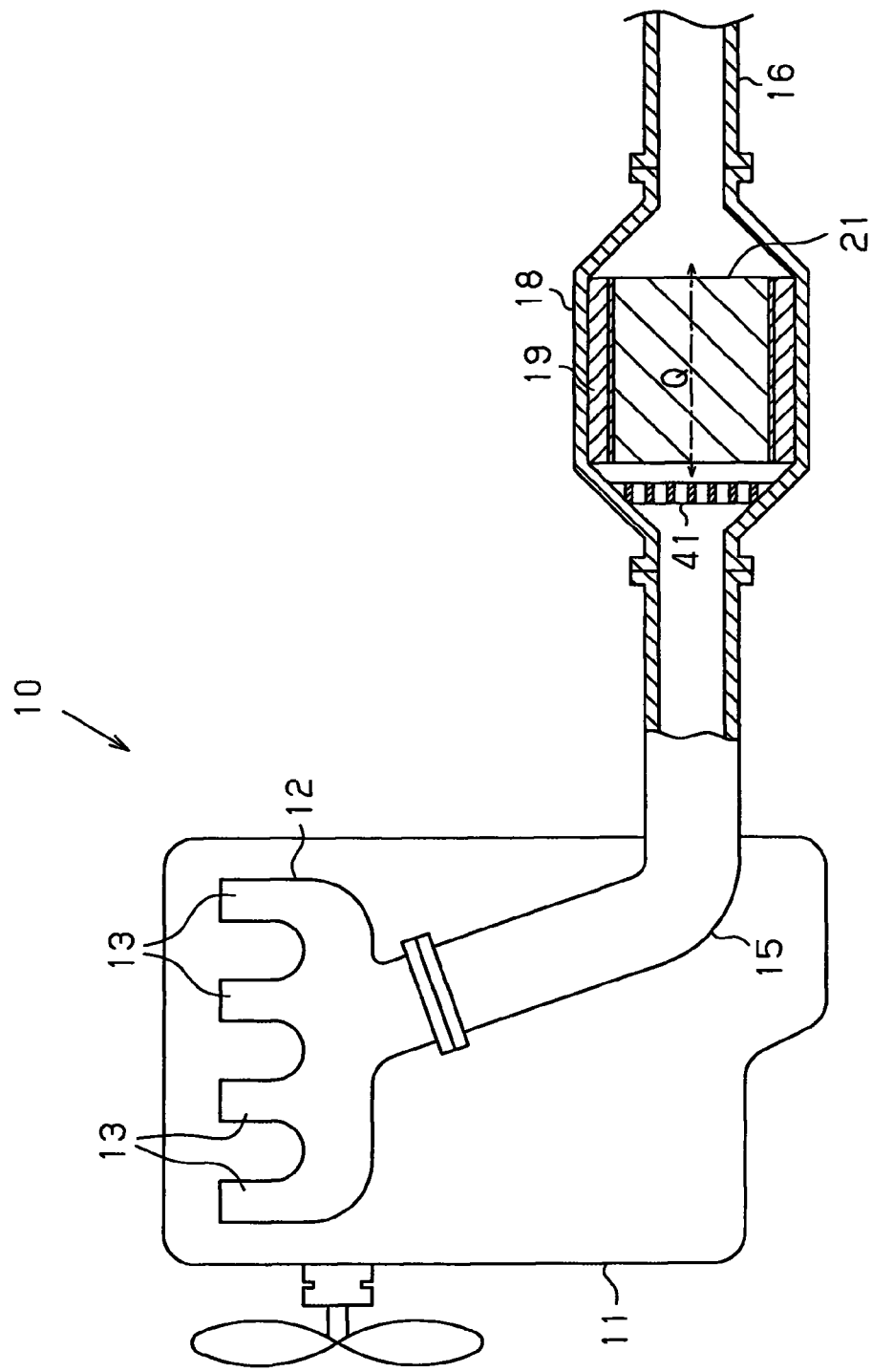
FIG. 1 is a schematic view of an exhaust gas purification device including a honeycomb structured body according to a preferred embodiment of the present invention.

One embodiment according to the present invention proposes a honeycomb structured body including a plurality of honeycomb members bonded together by a bonding material, each honeycomb member including an outer wall, a partition arranged inward from the outer wall, and a plurality of cells partitioned by the partition for functioning as a flow passage for a fluid, and an outer surface formed by an outer coating layer, a filter core portion including a plurality of first honeycomb members of the plurality of honeycomb members, each of the first honeycomb members having a vertical cross-section that is orthogonal to an axis of the honeycomb structured body and rectangular, a filter peripheral portion arranged outside the filter core portion and formed by a plurality of second honeycomb members of the plurality of honeycomb members, each of the second honeycomb members having a vertical cross-section that is orthogonal to the axis and irregular in shape, and a filling layer arranged between the outer coating layer and an outer surface of either one of the filter core portion and the filter peripheral portion.

When representing a cross-sectional area of the vertical cross-section of each first honeycomb member with S0 and representing a cross-sectional area of a vertical cross-section of the filling layer orthogonal to the axis with S1, it is preferable that a ratio of the area S1 to the area S0 be less than about 4%.

Depending on the shape of the honeycomb structured body, honeycomb members having an extremely small vertical cross-section have a tendency of being formed at equal angular intervals in the circumferential direction. In such a honeycomb structured body, it is preferred that a plurality of filling layers be arranged on the outer surface of the honeycomb structured body at equiangular intervals about the axis. Particularly, it is preferred that the plurality of filling layers be arranged on the outer surface of the honeycomb structured body at a 0-degree position on an extension of the outer wall of one of the first honeycomb members that is adjacent to the center of the honeycomb structured body, and an about 90-degree position, an about 180-degree position, and an about 270-degree position that are respectively separated from the 0-degree position by about 90 degrees, about 180 degrees, and about 270 degrees about the center or be arranged at the 0-degree position and an about 45-degree position, an about 135-degree position, an about 225-degree position, and an about 315-degree position that are respectively separated from the 0-degree position by about 45 degrees, about 135 degrees, about 225 degrees, and about 315 degrees about the center. The balanced arrangement of the filling layers in the honeycomb structured body is optimal for the removing of PM in the entire aggregation.

It is preferred that the filling layer be arranged to extend between end surfaces of the honeycomb structured body along the axis. Accordingly, there would be no gaps that hinder temperature rising in the filter peripheral portion between the outer coating layer and the filter core portion or the filter peripheral portion. Thus, the heat conductivity of the filter peripheral portion is satisfactory.

It is preferred that the filling layer contain inorganic particles. Inorganic particles cause the filling layer to have satisfactory heat conductivity. Accordingly it is possible to improve heat conductivity in the filter peripheral portion.

It is preferred that the filling layer contains either one of inorganic fibers and inorganic hollow bodies. The one of inorganic fibers and the inorganic hollow bodies improves heat resistance and strength of the filling layer. As a result, even when the filling layer thermally expands due to the heat generated when removing the PM captured in the partition, cracking of the filling layer may tend to be suppressed.

Further, it is preferred that the inorganic fibers have an average fiber diameter of about 1 to about 40 μm and an average fiber length of about 10 to about 200 μm. It is more preferred that the inorganic fibers have an average fiber diameter of about 6 to about 40 μm. This further increases the heat resistance of the filling layer.

It is preferred that the inorganic fibers have a tap density of about 55 to about 65 g/cm$^3$. This further increases the strength and adhesion of the filling layer. Thus, even when the filling layer thermally expands due to the heat generated when removing the PM captured in the partition, cracking of the filling layer may tend to be suppressed in an optimal manner.

It is preferred that the filling layer has a composition identical to that of the outer coating layer. This easily conducts heat between the filling layer and the outer coating layer and may tend to increase heat conduction at the peripheral portion of the honeycomb structured body.

It is preferred that each honeycomb member has a cell density of about 200 to about 300 cells per square inch. This may tend to obtain partition surface area that ensures sufficient capturing of the PM in the exhaust gas and thermal shock resistance. Additionally, pressure loss, which tends to occur as the cells become finer, may tend to be reduced and PM clogging (bridging) in the cells may tend to be suppressed.

It is preferred that the partition has a thickness of about 0.33 mm or less. This may make it easy to obtain the heat amount required to easily increase the rising speed of the partition temperature when removing the PM captured in the partition. If the partition has a thickness of about 0.1 mm or more, sufficient mechanical strength may be ensured for the honeycomb structured body.

In one embodiment, the honeycomb structured body has a vertical cross-section orthogonal to the axis that is circular or oval. In one example of the honeycomb structured body of one embodiment, a catalyst is carried by the partition. This makes it possible to easily burn and purify the PM collected in and on the partition.

The honeycomb structured body is manufactured by undergoing an aggregation formation step configured to bond a plurality of honeycomb members into an aggregation with a bonding material, with each honeycomb member having an outer wall, a partition arranged inward from the outer wall, and a plurality of cells partitioned by the partition for functioning as a flow passage for a fluid; a filling layer formation step configured to arrange filling layers at predetermined positions on an outer surface of the aggregation; and an outer coating layer formation step configured to form an outer coating layer on the outer surface of the aggregation.

In one example of the manufacturing method according to one embodiment, a cutting step configured to cut the outer surface of the aggregation is performed.

In one example of the manufacturing method according to one embodiment, the aggregation formation step, the filling layer formation step, the cutting step, and the outer coating layer formation step are performed in this order.

In a further example of the manufacturing method according to one embodiment, the filling layer formation step and the outer coating layer formation step are performed after the aggregation formation step and the cutting step are performed.

In another example of the manufacturing method according to one embodiment, when each of the honeycomb members is formed into a predetermined shape in advance. In this case, the filling layer formation step and the outer coating layer formation step are performed after the aggregation formation step is performed.

The filling layer formation step and the outer coating layer formation step may be performed simultaneously.

The aggregation includes a filter core portion including a plurality of first honeycomb members in the plurality of honeycomb members, each of the first honeycomb members having a vertical cross-section that is orthogonal to an axis of the honeycomb structured body and rectangular. A filter peripheral portion is arranged outside the filter core portion and formed by a plurality of second honeycomb members in the plurality of honeycomb members, each of the second honeycomb members having a vertical cross-section that is orthogonal to the axis and irregular in shape. The method further includes the step configured to form the second honeycomb members by cutting some of the plurality of honeycomb members before the aggregation formation step. The aggregation formation step includes forming the filter core portion and forming the filter peripheral portion around the filter core portion.

A honeycomb structured body according to a preferred embodiment of the present invention will now be described. In the preferred embodiment, the honeycomb structured body is adapted to use in a spontaneous ignition type vehicle exhaust gas purification device in which the captured PM is removed with only the heat from exhaust gas.

As shown in FIG. 1, an exhaust gas purification device 10 purifies, for example, exhaust gas discharged from a diesel engine 11. The diesel engine 11 includes a plurality of cylinders (not shown). A plurality of branch pipes 13 for an exhaust manifold 12, which is made of a metallic material, are connected to the cylinders.

A first exhaust pipe 15 and a second exhaust pipe 16, which are made of a metallic material, are arranged at positions downstream from the exhaust manifold 12. An upstream end of the first exhaust pipe 15 is connected to the manifold 12. A tubular casing 18, which is made of a metallic material, is arranged between the first exhaust pipe 15 and the second exhaust pipe 16. An upstream end of the casing 18 is connected to a downstream end of the first exhaust pipe 15. A downstream end of the casing 18 is connected to an upstream end of the second exhaust pipe 16. The interior of the first exhaust pipe 15, the casing 18, and the second exhaust pipe 16 communicate with one another. Exhaust gas flows through the interior of the first exhaust pipe 15, the casing 18, and the second exhaust pipe 16.

A middle portion of the casing 18 has a larger diameter than the exhaust pipes 15 and 16. The casing 18 has a larger inner area than that of the exhaust pipes 15 and 16. A honeycomb structured body 21 is accommodated in the casing 18. A heat insulator 19, separate from the honeycomb structured body 21, is arranged between the outer circumferential surface of the honeycomb structured body 21 and the inner circumferential surface of the casing 18. A catalyst carrier 41 is accommodated in the casing 18 at a position upstream from the honeycomb structured body 21. The catalyst carrier 41 internally supports an oxidation catalyst, which is known in the art. Exhaust gas is oxidized in the catalyst carrier 41. Oxidation heat generated during the oxidation is conducted into the honeycomb structured body 21 and used to remove PM in the honeycomb structured body 21.

The honeycomb structured body 21 of the preferred embodiment will now be discussed. In this specification, the term "vertical cross-section" refers to a cross-section orthogonal to an axis Q of the honeycomb structured body 21. The shape of the vertical cross-section is referred to as a "vertical cross-sectional shape" and the area of the vertical cross-section is referred to as a "vertical cross-sectional area".

Figure 2A:
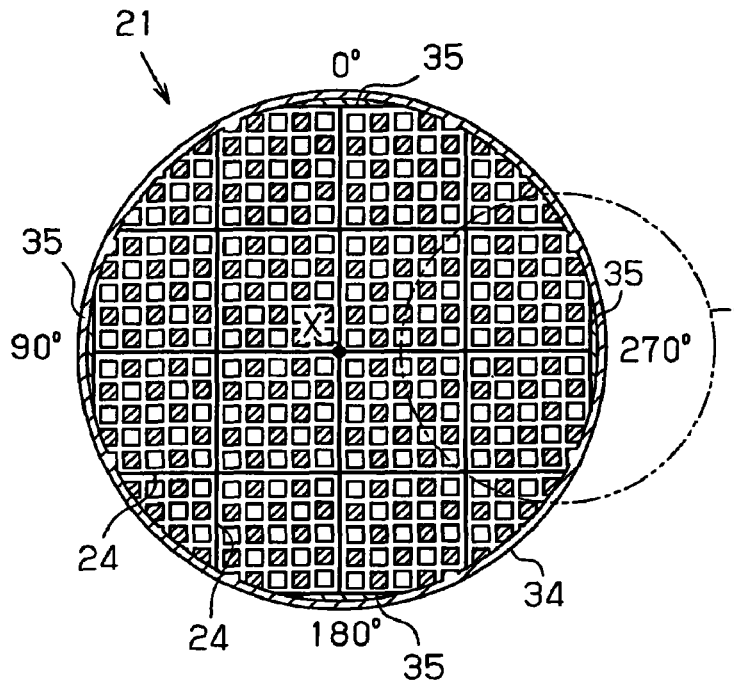
FIG. 2A is a vertical cross-sectional view of the honeycomb structured body of the preferred embodiment.

As shown in FIG. 2A, the honeycomb structured body 21 is obtained by bonding a plurality of (sixteen in the preferred embodiment) honeycomb members 22, which have rectangular pillar shapes, into a bundle or an aggregation with a bonding material 24 and cutting the outer surface of the aggregation into a predetermined shape. The bonding material 24 may contain an inorganic binder, an organic binder, and inorganic fibers.

The honeycomb structured body 21 includes a filter core portion 21A having a rectangular cross-section and a filter peripheral portion 21B arranged to surround the filter core portion 21A. The honeycomb structured body 21 is formed to have a circular cross-section (with a diameter of about 143 mm and a vertical cross-sectional area of about 160.6 cm$^2$) The filter core portion 21A, the filter peripheral portion 21B, honeycomb members 22 forming the filter core portion 21A, and honeycomb members 22 forming the filter peripheral portion 21B will now be described.

Figure 2B:
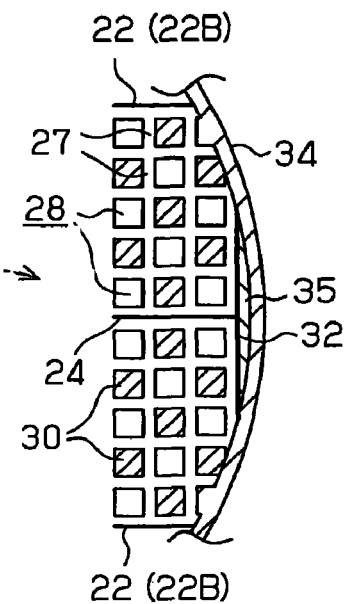
FIG. 2B is a partially enlarged view of the honeycomb structured body of FIG. 2A.
Figure 2C:
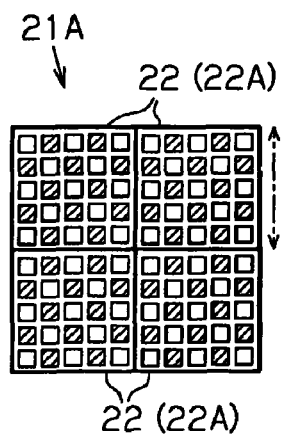
FIG. 2C is a cross-sectional view of a filter core portion of the honeycomb structured body of FIG. 2A.
Figure 3:
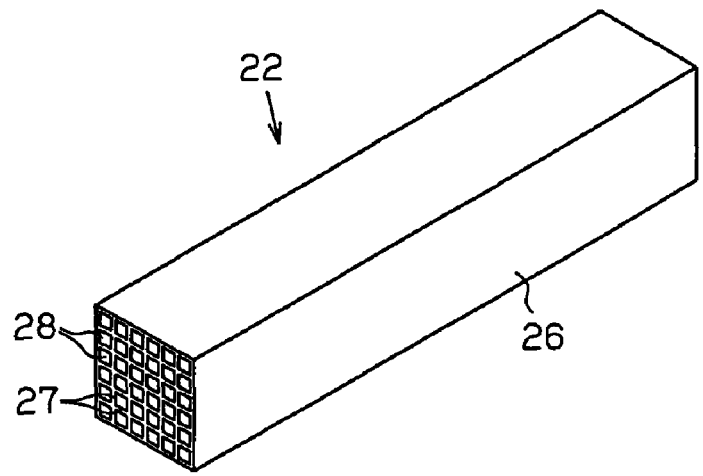
FIG. 3 is a perspective view of a honeycomb member.

The filter core portion 21A is arranged in a central portion of the honeycomb structured body 21. As shown in FIG. 2C, the filter core portion 21A is formed by four honeycomb members 22 (first honeycomb members 22A). As shown in FIG. 3, each first honeycomb member 22A includes an outer wall 26 and partitions 27 extending inward from the outer wall 26. Each first honeycomb member 22A has a rectangular vertical cross-section. In the preferred embodiment, each first honeycomb structured body 22A has a vertical cross-sectional area of about 11.8 cm$^2$.

The outer wall 26 and the partitions 27 of each first honeycomb member 22A are formed mainly from porous ceramic. Examples of the porous ceramic include nitride ceramics such as aluminum nitride, silicon nitride, boron nitride, and titanium nitride, or carbide ceramics such as silicon carbide, zirconium carbide, titanium carbide, tantalum carbide, and tungsten carbide, or oxide ceramics such as alumina, zirconia, cordierite, mullite, silica, and aluminum titanate, and a metallic silicon—silicon carbide composite or the like.

It is preferable that the thickness of the partitions 27 be about 0.33 mm or less. The temperature of the partitions 27, having a thickness of about 0.33 mm or less may easily increase when PM captured on and in the partitions 27 is removed. It is preferable that the thickness of the partitions 27 be set about 0.1 mm or more to enable the honeycomb structured body 21 to have a sufficiently high mechanical strength.

The partitions 27 in the preferred embodiment may carry a platinum group element (Pt for example), or an oxidation catalyst composed of another metallic element and its oxide. In this case, the catalytic action of the oxidation catalyst may tend to accelerate removing of the PM captured on and in the partitions 27.

Figure 4:
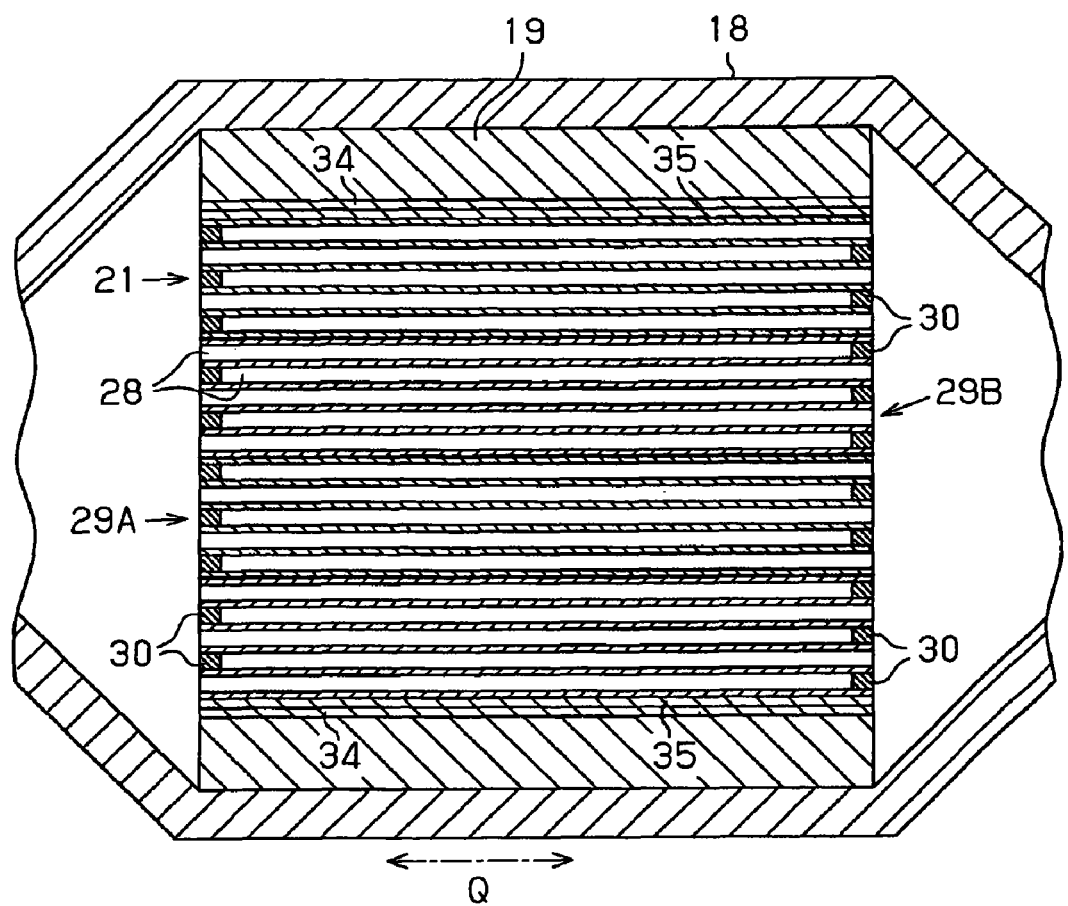
FIG. 4 is a cross-sectional view showing an inner structure of the casing shown in FIG. 1.

The honeycomb member 22 (22A) has a plurality of cells 28 that are partitioned by the partitions 27. As shown in FIG. 4, each cell 28 extends from one end surface (upstream end surface) 29A to another end surface (downstream end surface) 29B along the axis Q and functions as a flow passage for the exhaust gas, which serves as a fluid. Each cell 28 has an opening formed at the end surface 29A and an opening formed at the end surface 29B. One opening of each cell 28 is sealed by a plug 30, which is made, for example, of a sintered porous silicon carbide. A plurality of plugs 30 are arranged in a lattice on each of the end surfaces 29A and 29B. More specifically, substantially half of the cells 28 open at the upstream end surface 29A and substantially half of the remaining cells 28 open at the downstream end surface 29B.

The cell density of the honeycomb member 22 is about 200 to about 300 cells per square inch (cpsi) and preferably about 200 to about 250 cpsi. In this specification, the "cell density" refers to the number of cells per cross-sectional area. When the cell density of the honeycomb member 22 is about 200 cpsi or more, this may tend to have the surface area of the partitions 27 large enough to sufficiently capture the PM contained in the exhaust gas. When the cell density is 300 cpsi or less, this may tend to have the surface area of the partitions 27 and the thermal shock resistance of the honeycomb members 22 large enough to sufficiently capture PM contained in the exhaust gas. Further, the clogging (bridging) by PM in the cells is less likely to occur in this case. Moreover, the cells may not be excessively small. This may avoid an increase in pressure loss, a decrease in the output of the internal combustion engine, and deterioration of fuel efficiency.

Figure 2D:
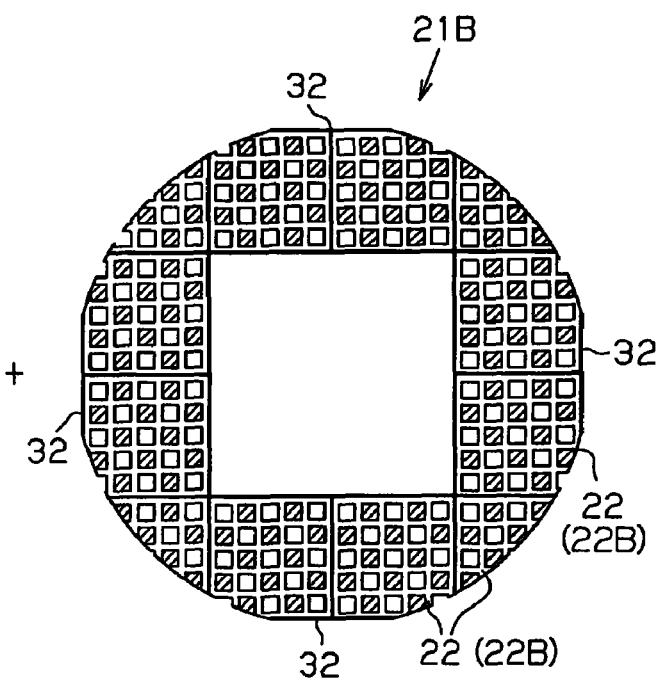
FIG. 2D is a cross-sectional view of a filter peripheral portion of the honeycomb structured body of FIG. 2A.

As shown in FIG. 2D, the filter peripheral portion 21B is formed by twelve honeycomb members 22 (second honeycomb members 22B). The outer surface of the filter peripheral portion 21B has flat portions 32 that are arranged at 90-degree intervals. Each flat portion 32 extends along the axis Q on the outer surface of the filter peripheral portion 21B. The flat portions 32 are formed when the honeycomb structured body 21 having a diameter of about 143 mm is manufactured by combining 16 second honeycomb members 22B together.

Each second honeycomb member 22B has a vertical cross-section with an irregular shape. In this specification, the term "irregular shape" refers to, for example, a cross-sectional shape of a honeycomb member obtained by performing predetermined cutting on a honeycomb member having a rectangular pillar shape. In particular, the "irregular shape" does not refer to a shape formed by either one of only straight lines and curved lines, such as a circle, an oval, a triangle, or a polygon. "Irregular shape" refers to a shape having both straight lines and curved lines. Examples of irregular shape cross-section include a cross-section defined by two straight lines and an arc, a cross-section defined by three straight lines and an arc, and a cross-section defined by four straight lines and an arc. The "straight lines" and the "curved lines" will now be described. When the aggregation of the honeycomb members is cut, some of the partitions and some of the sealing material included in the aggregation are removed. As a result, the outer surface of the aggregation has projections and recessions. A hypothetical line connecting the projections exposed from the outer surface of the aggregation is referred to as a "straight line" or a "curved line" in this specification. The aggregation of the honeycomb members 22B that are formed by extrusion has partitions on its side surface (circumferential surface). In this case, the partition portion of the circumferential surface of the aggregation is referred to as the "straight line" or the "curved line" in this specification. The structure of each honeycomb member 22B is the same as the structure of the first honeycomb member 22A except its vertical cross-sectional shape (i.e., in material, thickness of the partitions 27, and cell density). The plurality of second honeycomb members 22B forming the filter peripheral portion 21B may have identical or different vertical cross-sections. At least one of the plurality of second honeycomb members 22B forming the filter peripheral portion 21B may have a structure identical to that of the first honeycomb member 22A forming the filter core portion 21A, that is, a rectangular vertical cross-section. Accordingly, the filter peripheral portion 21B may be formed by honeycomb members having a vertical cross-section with an irregular shape and honeycomb members with a rectangular vertical cross section. It is preferred that most of the honeycomb members forming the filter peripheral portion 21B have an irregular shape.

When the vertical cross-sectional area of each first honeycomb member 22A is represented by S0 and the vertical cross-sectional area of a selected second honeycomb member 22B forming the filter peripheral portion 21B is represented by S2, the ratio of the cross-sectional area S2 to the cross-sectional area S0 is about 4% or more. When this ratio is about 4% or more, that is, when none of the second honeycomb members 22 forming the filter peripheral portion 21B have an extremely small vertical cross-sectional area, PM may tend to be sufficiently removed in all the honeycomb members 22. In this case, the cells 28 of all the honeycomb members 22 may tend to be prevented from being clogged by unburned residual PM. When this ratio is less than about 4%, that is, when at least one of the second honeycomb members 22B forming the filter peripheral portion 21B has an extremely small vertical cross-sectional area, it is difficult to sufficiently remove the PM captured on the honeycomb member 22B having an extremely small vertical cross-sectional area. In this case, the cells 28 of the honeycomb member 22B having an extremely small vertical cross-section is likely to be clogged by unburned residual PM.

A plurality of filling layers 35 are arranged on the outer surface of the filter peripheral portion 21B. More specifically, the filling layers 35 are arranged to fill gaps between the flat portions 32 of the filter peripheral portion 21B and an outer coating layer 34. In the example of FIG. 2A, the filling layers 35 are arranged on the outer surface of the honeycomb structured body 21 at equiangular intervals about a center X of the honeycomb structured body 21 (e.g., 0-degree, about 90-degree, about 180-degree, and about 270-degree positions). On the outer surface of the honeycomb structured body 21, the 0-degree position is on an extension of the outer wall 26 of a first honeycomb member 22A that is adjacent to the center X and extends parallel to direction P (refer to FIG. 2C). On the outer surface of the honeycomb structured body 21, the about 90-degree, about 180-degree, and about 270-degree positions are respectively separated from the 0-degree position by about 90 degrees, about 180 degrees, and about 270 degrees. The outer coating layer 34 is applied with substantially uniform thickness to the outer surface of the filter peripheral portion 21B. The filling layers 35 are arranged between the outer surface of the filter peripheral portion 21B and the outer coating layer 34.

The filter peripheral portion 21B shown in FIG. 2B has been subjected to cutting. In this case, the outer surface of the filter peripheral portion 21B partially has projections and recessions. The outer coating layer 34 is applied to cover the projections and the recessions. As a result, the recessions formed on the outer surface of the filter peripheral portion 21B are filled by the material forming the outer coating layer 34. When the filter peripheral portion 21B uses the second honeycomb members 22B having irregular shapes that are formed by extrusion, the entire outer surface of the filter peripheral portion 21B is formed by a side wall having no recessions and projections. In this case, the outer coating layer 34 is applied to cover the side wall.

When the vertical cross-sectional area of the filling layer 35 is S1 and the vertical cross-sectional area of each first honeycomb member 22A forming the filter core portion 21A is S0, the ratio of the area S1 to the area S0 is less than about 4%. When this ratio is about 4% or more, the temperature of the filling layer 35 may occur surface irregularity and the internal heat stress of the filling layer 35 may excessively increase when heating is performed with the exhaust gas. In this case, the filling layers 35 may crack or peel off. Thus, when this ratio for at least one of the filling layers 35 is about 4% or more, it is preferable that the at least one of the filling layers 35 be replaced by a second honeycomb member 22B. This is because the amount of heat can become large enough to sufficiently remove PM when the vertical cross-sectional area S2 of the second honeycomb member 22B to the vertical cross-sectional area S0 of the first honeycomb member 22A forming the filter core portion 21A is about 4% or more as described above. The filling layers 35 are arranged in parts of the outer surface of the honeycomb structured body 21 in a manner that the filling layers 35 extend between the end surfaces 29A and 29B along the axis Q (refer to FIG. 4).

The filling layers 35 contain inorganic particles and inorganic fibers. The inorganic particles function to give the filling layers 35 satisfactory heat conductivity. Examples of the inorganic particles include a ceramics selected from the group consisting of silicon carbide, silicon nitride, cordierite, alumina (e.g., molten alumina or sintered alumina), mullite, zirconia, zirconium phosphate, aluminum titanate, titania, silica (e.g., molten silica), and mixture thereof; an ironchrome-aluminum metal; a nickel metal; and a metallic silicon-silicon carbide composite or the like. These different kinds of inorganic particles may be used solely. Alternatively, two or more of these kinds may be used in combination.

The inorganic fibers function to improve the heat resistance and the strength of the filling layers 35. Examples of the inorganic fibers include silica-alumina ceramic fibers, mullite fibers, silica fibers, alumina fibers, and zirconia fibers. These different kinds of inorganic fibers may be used solely. Alternatively, two or more of these kinds may be used in combination. In the preferred embodiment, the inorganic fibers having specific properties are used to improve the heat resistance and the strength of the filling layers 35. The properties of the inorganic fibers used in the preferred embodiment will now be described.

The average fiber diameter of the inorganic fibers in the preferred embodiment is preferably about 1 to about 40 µm and more preferably about 6 to about 40 µm. The average fiber length of the inorganic fibers is preferably about 10 to about 200 µm and more preferably about 20 to about 30 µm. In this specification, the "average fiber diameter" refers to an average value of the fiber diameter values of a plurality of fibers that are randomly selected from a micrograph showing the cross-section of the filling layer 35, which is obtained using a scanning electron microscope. The "average fiber length" refers to an average value of the fiber length values of randomly selected fibers.

When the inorganic fibers have an average fiber diameter of about 1 µm or more and an average fiber length of about 10 µm or more, it may be easy to ensure a sufficiently high heat resistance and a sufficiently high strength for the filling layers 35. In this case, the heating using the exhaust gas may not cause the filling layers 35 to crack or to peel off easily. When the inorganic fibers have an average fiber diameter of about 40 µm or less and an average fiber length of about 200 µm or less, the heat resistance and the strength of the filling layers 35 may increase. Further, when the inorganic fibers have an average fiber diameter exceeding about 40 µm and an average fiber length exceeding about 200 µm, the inorganic fibers do not improve the heat resistance and the strength of the filling layers 35 any further, and such inorganic fibers are not economical. The inorganic fibers having an average fiber diameter of about 6 to about 40 µm have less impact on the human body.

The tap density of the inorganic fibers is preferably about 55 to about 65 g/cm$^3$ and more preferably about 55 to about 60 g/cm$^3$. In this specification, the "tap density" refers to the volume density of the inorganic fibers that is obtained by tapping the container under certain conditions. A tap density having a greater value indicates that the inorganic fibers are filled more densely. When the tap density of the inorganic fibers is about 55 g/cm$^3$ or more, it may be easy to ensure sufficiently high heat resistance and sufficiently high strength for the filling layers 35. When the tap density of the inorganic fibers is about 65 g/cm$^3$ or less, the orientation of the fibers may not be so high that the bonding strength of the filling layers 35 to the honeycomb members 22 may not decrease.

Instead of the inorganic fibers or in addition to the inorganic fibers, the filling layers 35 may contain inorganic hollow bodies (inorganic balloons). Examples of the inorganic hollow bodies include glass micro balloons, alumina balloons, and ceramic balloons. The average particle diameter of the inorganic hollow bodies is not limited to particular values.

The filling layers 35 may further contain an inorganic binder, an organic binder, etc. Examples of the inorganic binder include an alumina sol, a silica sol, and a titania sol. These binders may be used solely. Alternatively, two or more of these binders may be used in combination. Examples of the organic binder include hydrophilic organic polymers, such as carboxymethyl cellulose, polyvinyl alcohol, methyl cellulose, and ethyl cellulose. These organic binders may be used solely. Alternatively, two or more of these binders may be used in combination.

The outer coating layer 34 functions to prevent displacement of the honeycomb structured body 21 within the casing 18. The composition of the outer coating layer 34 may be the same as the composition of the filling layers 35. The outer coating layer 34 is arranged to cover the entire outer surface of the filter peripheral portion 21B.

The outer coating layer 34 may be formed after the filling layers 35 are formed. The filling layers 35 and the outer coating layer 34 may be formed simultaneously.

The manufacturing method for the honeycomb structured body according to the preferred embodiment will now be described.

First, a plurality of honeycomb members 22 are prepared. Each honeycomb member 22 has an outer wall 26 and partitions 27 for partitioning a plurality of cells 28 that function as a flow passage for a fluid. The honeycomb members 22 are bonded into an aggregation S using a bonding material 24 (assembly formation process). The outer surface of the aggregation S may be cut as necessary to adjust the shape of the aggregation S (cutting process). When honeycomb members 22 having predetermined irregular shapes, such as honeycomb members 22 that are manufactured by extrusion, are used, the cutting process of the aggregation S does not have to be performed. Filling layers 35 are arranged at predetermined positions on the outer surface of the aggregation S (filling layer formation process). An outer coating layer 34 is applied on the outer surface of the aggregation S (outer coating layer formation process). This completes the manufacturing of the honeycomb structured body according to the preferred embodiment of the present invention.

Figure 5:
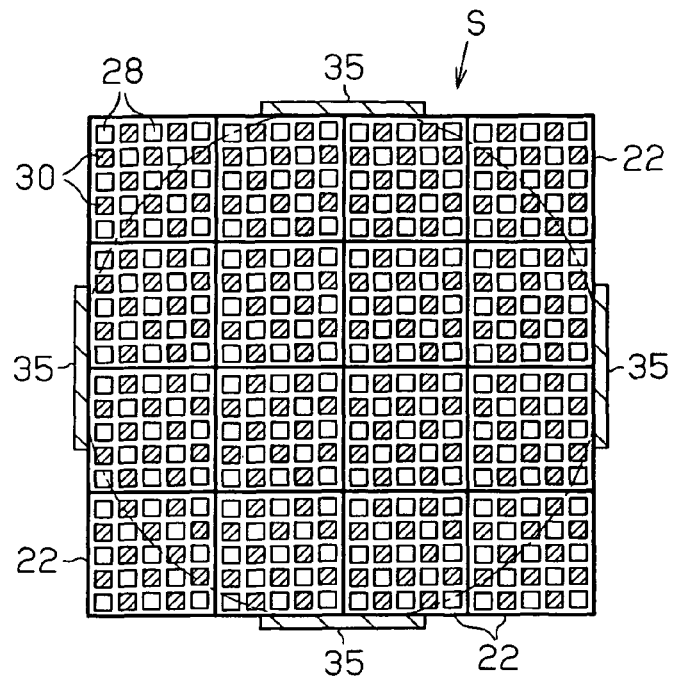
FIG. 5 is a vertical cross-sectional view of an aggregation of honeycomb members.

A first manufacturing example in which the aggregation formation process, the filling layer formation process, the cutting process, and the outer coating layer formation process are performed in this order will now be described. First, intermediate extruded bodies are formed through extrusion using, for example, a plunger type extrusion machine or a biaxial screw continuous extrusion machine. The intermediate extruded bodies are then fired to obtain honeycomb members 22. Sixteen honeycomb members 22 are bonded into an aggregation S with a bonding material 24 (refer to FIG. 5). Filling layers 35 are arranged at predetermined positions of the outer surface of the aggregation S (at middle positions of the side surfaces of the aggregation S). Next, the outer surface of the aggregation S is cut using a diamond tool etc. so that the cross-sectional shape of the aggregation S becomes circular. An outer coating layer 34 is applied to the entire outer surface of the aggregation S. This completes the manufacturing of the honeycomb structured body 21 shown in FIG. 2A.

Figure 6:
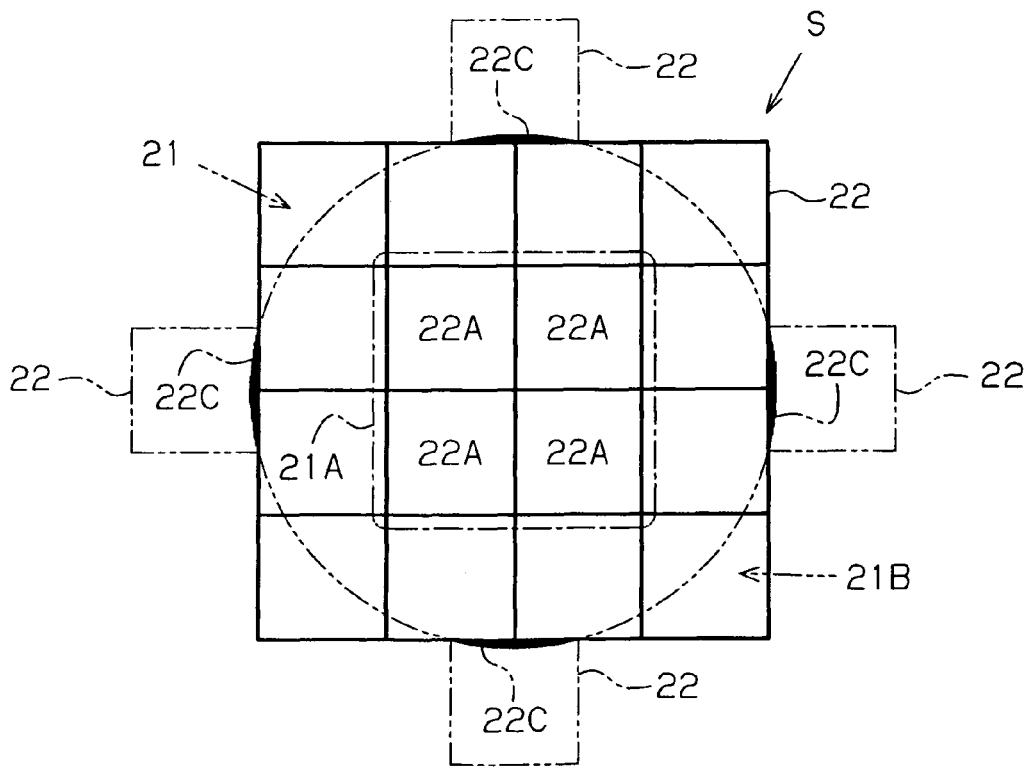
FIG. 6 is a diagram describing cutting of the aggregation of the honeycomb members of FIG. 5.

When the honeycomb structured body 21 having a circular vertical cross-section is manufactured in the cutting process, the honeycomb members 22B forming the filter peripheral portion 21B are formed to have irregular shapes. In such a case, depending on the number of the honeycomb members 22 to be bonded or the diameter of the honeycomb structured body 21, predetermined honeycomb members (22C) forming the filter peripheral portion 21B may have vertical cross-sectional areas that are much smaller than the vertical cross-sectional area S0 of the honeycomb member 22A forming the filter core portion 21A (refer to FIG. 6). For example, a honeycomb structured body 21 having the same diameter as the honeycomb structured body of the preferred embodiment (143 mm) may be formed by additionally arranging one honeycomb member 22 at the middle position of each side surface of the aggregation S of the honeycomb members 22 as shown in FIG. 6. In this case, each honeycomb member 22 arranged on the side surface of the aggregation S is a honeycomb member 22C having a vertical cross-sectional area ratio less than about 4% to the vertical cross-sectional area S0 of the honeycomb member 22A forming the filter core portion 21A. In such honeycomb members 22C having extremely small cross-sectional areas, the PM captured by the partitions 27 may not be sufficiently burned. When such a honeycomb structured body 21 is continuously used in this state, PM accumulates over time in the honeycomb members 22C having the extremely small vertical cross-sectional areas. As a result, the cells 28 of the honeycomb members 22C may be clogged by the PM. This not only lowers the exhaust gas purification efficiently but may also cause the honeycomb structured body 21 (in particular the peripheral portion of the honeycomb structured body 21) to crack when the honeycomb structured body 21 is subjected to heat shock generated by self-ignition of the PM.

To prevent this, the honeycomb members 22C having extremely small vertical cross-sectional areas in which the cells 28 are likely to be clogged are not formed. Instead, the filling layers 35 are formed at the positions of such honeycomb members 22C (refer to FIG. 2B). In this way, the honeycomb structured body 21 does not include the members in which the cells 28 are likely to be excessively clogged (honeycomb members 22C having extremely small vertical cross-sectional areas). The peripheral portion of the honeycomb structured body 21 of the preferred embodiment is formed only by second honeycomb members 22B having sufficiently large vertical cross-sectional areas. More specifically, the peripheral portion is formed only by the second honeycomb members 22B having a vertical cross-sectional area ratio of about 4% or more to the vertical cross-sectional area S0 of the first honeycomb member 22A. As a result, each honeycomb member 22B forming the filter peripheral portion 21B retains an amount of heat large enough to sufficiently remove PM during heating using the exhaust gas. The honeycomb structured body 21 of the preferred embodiment may prevent the cells 28 of the filter peripheral portion 21B from being clogged, and may prevent the peripheral portion of the honeycomb structured body 21 from cracking.

The filling layers 35 are filled at the positions of the honeycomb members having extremely small vertical cross-sectional areas. The filling layers 35 prevent gaps from being formed between the filter peripheral portion 21B and the outer coating layer 34, and this may prevent the exhaust gas from entering between the filter peripheral portion 21B and the outer coating layer 34. Further, the filling layers 35 containing the inorganic particles have satisfactory heat conductivity. Thus, the filling layers 35 also contribute to improving the heat conductivity of the filter peripheral portion 21B.

When the filling layer 35 has an extremely large vertical cross-sectional area S1, the temperature of the filling layer 35 may occur surface irregularity and the internal heat stress of the filling layer 35 may increase excessively when heating is performed with the exhaust gas. In this case, the filling layer 35 may crack or peel off. As a result, the exhaust gas may enter between the filter peripheral portion 21B and the outer coating layer 34. However, the ratio of the vertical cross-sectional area S1 of the filling layer 35 to the vertical cross-sectional area S0 of the first honeycomb member 22A is less than about 4% in the preferred embodiment. Thus, the temperature of the filling layer 35 may not vary greatly and the internal heat stress of the filling layer 35 may not increase excessively when heating is performed with the exhaust gas. Thus, the filling layer 35 may be prevented from cracking or peeling off and a gap formation may hardly occur between the filter peripheral portion 21B and the outer coating layer 34. This may prevent non-purified exhaust gas from being discharged.

A second manufacturing example in which the aggregation formation process and the cutting process are first performed and the filling layer formation process and the outer coating layer formation process are then performed will now be described.

The aggregation formation process and the cutting process are the same as in the first manufacturing example. Filling layers 35 are formed on the filter peripheral portion 21B. Afterwards, an outer coating layer 34 is formed to cover the filling layers 35 and the filter peripheral portion 21B. When the filling layers 35 are formed, the filling layers 35 are selectively filled in parts of the filter peripheral portion 21B that are recessed from a hypothetical contour line (e.g., a circle) of the filter peripheral portion 21B. At this point, it is preferable that the filling layers 35 be formed to project from the hypothetical outer circumference. This is because the filling, layers 35 projecting from the hypothetical outer circumference reduce projections and recessions on the outer surface of the honeycomb structured body 21 after the outer coating layer 34 is formed. The projections and the recessions on the outer surface of the honeycomb structured body 21 not only cause leakage of the exhaust gas but also makes it difficult to hold the sealing material (heat insulator 19) with the honeycomb structured body 21.

Third and fourth manufacturing examples in which the filling layer formation process and the outer coating layer formation process are performed simultaneously after the aggregation formation process and the cutting process are performed will now be described.

The aggregation formation process and the cutting process are the same as in the first manufacturing example. In the third manufacturing example, paste materials for forming the filling layers 35 and the outer coating layer 34 are applied to the filter peripheral portion 21B with a spatula. This enables the filling layers 35 and the outer coating layer 34 to be formed simultaneously. In the fourth manufacturing example, the filter peripheral portion 21B is accommodated in a tubular jig. The paste materials for forming the filling layers 35 and the outer coating layer 34 are injected into a gap formed between the jig and the filter peripheral portion 21B. After the paste materials are dried, the jig is taken off. This obtains the honeycomb structured body 21. It is preferable that the jig be formed by a plurality of components that are separable from one another. This is to facilitate the taking out the honeycomb structured body 21 from such a jig. The fourth manufacturing example is more advantageous than the third manufacturing example because the fourth manufacturing example includes less and easier processes.

Fifth and sixth manufacturing examples in which the filling layer formation process and the outer coating layer formation process are performed after the aggregation formation process is performed will now be described.

In the fifth manufacturing example, the second honeycomb members 22B having desired irregular shape cross-sections are prepared by extruding such second honeycomb members 22B. In the sixth manufacturing example, the honeycomb members 22 having rectangular pillar shapes are cut to prepare the second honeycomb members 22B having desired irregular shape cross-sections. A plurality of first honeycomb members 22A and a plurality of second honeycomb members 22B are bonded into an aggregation S with a bonding material 24. The filling layer formation process and the outer coating layer formation process are the same as in the third and fourth manufacturing examples. The fifth manufacturing example is more advantageous than the sixth manufacturing example because the fifth manufacturing example includes less and easier processes. The second to sixth manufacturing examples also have the same advantages as the first manufacturing example.

Further, a honeycomb structured body having a circular vertical cross-section may be manufactured by simply bonding together a plurality of honeycomb members without forming filling layers. With this method, some of the honeycomb members may have relatively fragile acute-angle portions. Such acute-angle portions are easily chipped. In such a case, some honeycomb members may have an outer shape formed by acute-angle portions that are chipped and rounded when the honeycomb members are extruded. In this case, the honeycomb members having desired shapes may not be correctly manufactured. This method that does not form the filling layers is disadvantageous in that the yield of the honeycomb structured body 21 may decrease. The first to sixth manufacturing examples do not cause the honeycomb members 22 to have acute-angle portions. Therefore it may be easy to correctly manufacture the honeycomb members having desired shapes. Further, the above method that does not form the filling layers cannot be used to manufacture the honeycomb structured body 21 of FIG. 9 although the method can be used to manufacture the honeycomb structured bodies 21 of FIGS. 6 to 8 and FIG. 10. Thus, the method that does not form the filling layers is disadvantageous in its narrow range of the honeycomb structured bodies 21 that can be manufactured.

Subsequent to the formation of the filter core portion 21A, the filter peripheral portion 21B may be formed outside the filter core portion 21A. The filter core portion 21A and the filter peripheral portion 21B may first be formed separated and then be integrated with each other. The filter core portion 21A and the filter peripheral portion 21B may also be simultaneously formed.

In the honeycomb structured body having a circular cross-section described in JP-A 2005-154202, each honeycomb member forming a peripheral portion of the structure is cut to have an isosceles right triangular cross-section. In this case, depending on the diameter of the honeycomb structured body or the number of the honeycomb members bonded together, some of the honeycomb members forming the peripheral portion may have extremely small cross-sectional areas.

In a conventional honeycomb structured body, heat easily escapes from the peripheral portion toward the casing of the structure. As a result, the temperature at the peripheral portion tends to be lower than the temperature at a central portion of the structure. In particular, when a sealing material is interposed between adjacent honeycomb members of the honeycomb structured body, the sealing material weakens heat conduction and causes the temperature of the peripheral portion to decrease easily. In this way, the temperature of the peripheral portion of the honeycomb structured body may often fail to be high enough to sufficiently burn and remove PM. In this case, unburned PM is likely to reside on the partitions of the honeycomb members forming the peripheral portion of the honeycomb structured body. Among the honeycomb members forming the peripheral portion of the honeycomb structured body, the temperature of honeycomb members having extremely small cross-sectional areas is likely to decrease greatly and cause such unburned residual PM. As a result, cells of the honeycomb members having extremely small cross-sectional areas are likely to be clogged by PM. The PM that has clogged the cells may self-ignite in some situations and may locally generate thermal shock. As a result, the honeycomb structured body (in particular the peripheral portion of the honeycomb structured body) may crack.

The preferred embodiment according to the present invention has the advantages described below.

(1) The honeycomb members that would retain a small amount of heat therein, that is, the honeycomb members having extremely small vertical cross-sectional areas, are not used to remove PM and are not formed in the preferred embodiment. The filling layers 35 are formed so as to take the positions of such honeycomb members. This honeycomb structured body does not include honeycomb members in which their cells 28 are likely to be clogged excessively. This may likely to prevent the cells 28 of the filter peripheral portion 21B from being clogged and to prevent the peripheral portion of the honeycomb structured body 21 from cracking in an optimal manner.

(2) When the vertical cross-sectional area of each filling layer 35 is S1 and the vertical cross-sectional area of each first honeycomb member 22A forming the filter core portion 21A is S0, the ratio of the area S to the area S0 is less than about 4%. The filling layers 35 formed instead of the honeycomb members having a vertical cross-sectional area ratio of less than about 4% to the vertical cross-sectional area S0 of the honeycomb member 22 forming the filter core portion 21A prevents the cells 28 of the filter peripheral portion 21B from being clogged. Further, with the ratio of the vertical cross-sectional area S1 of the filling layer 35 being less than about 4%, the temperature of the filling layer 35 does not occur surface irregularity greatly and the internal heat stress of the filling layer 35 does not increase excessively when heating is performed with the exhaust gas. As a result, the filling layer 35 may likely to be prevented from cracking or peeling off.

(3) The filter peripheral portion 21B is formed only by the honeycomb members 22B each having a vertical cross-sectional area ratio of about 4% or more to the vertical cross sectional area S0 of the honeycomb member 22A forming the filter core portion 21A. This enables all the honeycomb members 22 forming the filter peripheral portion 21B to retain an amount of heat large enough to sufficiently remove PM captured on their partitions 27. As a result, the cells 28 of the peripheral portion of the honeycomb structured body 21 of the preferred embodiment may be prevented from being clogged by PM in an optimal manner.

(4) The filling layers 35 are arranged to extend between the end surfaces 29A and 29B of the honeycomb structured body 21 along the axis Q. This prevents gaps from being formed between the filter peripheral portion 21 and the outer coating layer 34. As a result, the filter peripheral portion 21B conducts heat in an optimal manner.

(5) The filling layers 35 containing the inorganic particles have sufficiently high heat conductivity. As a result, the filter peripheral portion 21B conducts heat in a optimal manner.

(6) The filling layers 35 contain the inorganic fibers having an average fiber diameter of about 1 to about 40 µm and an average fiber length of about 10 to about 200 µm to increase the heat resistance and strength of the filling layers 35. This may prevent the filling layers 35 from cracking or peeling off.

(7) The tap density of the inorganic fibers is about 55 to about 65 g/cm$^3$. This further increases the strength and the bonding force of the filling layers 35. Thus, the filling layers 35 are easily prevented from cracking or peeling off.

(8) The filling layers 35 have the same composition as the outer coating layer 34. Thus, heat is easily conducted between the filling layers 35 and the outer coating layer 34. This increases the heat conductivity of the peripheral portion of the honeycomb structured body 21 in an optimal manner.

(9) It is preferable that the partitions 27 of the honeycomb members 22 carry an oxidation catalyst. The oxidation catalyst accelerates removing of the PM captured on and in the partitions 27. In this case, the PM is easily burned and purified.

(10) The cell density of each honeycomb member 22 is about 200 to about 300 cpsi. This may enable the partitions 27 to have a surface area large enough to sufficiently capture PM contained in the exhaust gas. This further may enable the pressure loss to decrease, and minimizes the clogging (bridging) by PM in the cells.

(11) The thickness of the partitions 27 is about 0.33 mm or less. Thus, the temperature of the partitions increases rapidly when the PM captured on and in the partitions 27 is removed. As a result, the PM is easily removed. When the thickness of the partitions is about 0.1 mm or more, the mechanical strength of the honeycomb structured body 21 may be sufficiently high.

The preferred embodiment may be modified in the following forms.

Figure 7:
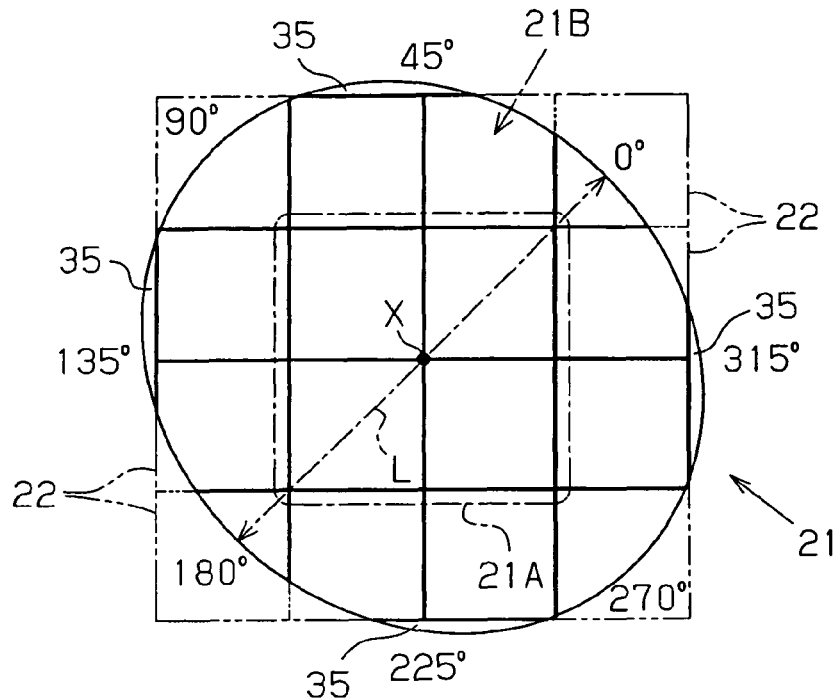
FIG. 7 is a schematic view of a honeycomb structured body according to a first modification.

The honeycomb structured body 21 may have an oval cross-section as in a first modification shown in FIG. 7. In this case, the filling layers 35 are arranged on the outer surface of the honeycomb structured body 21 at equiangular interval positions (about 45-degree, about 135-degree, about 225-degree, and about 315-degree positions) about the center X. In this example, the 0-degree position on the outer surface of the honeycomb structured body 21 is on an extension of a minor axis L extending through the center X.

Figure 8:
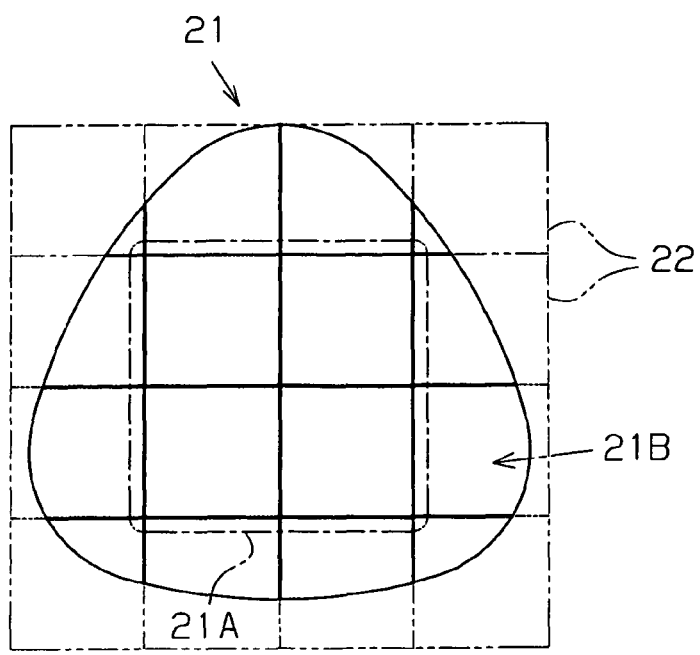
FIG. 8 is a schematic view of a honeycomb structured body according to a second modification.

The honeycomb structured body 21 may have a generally triangular vertical cross-section as in a second modification shown in FIG. 8.

Although the filling layers 35 and the outer coating layer 34 have the same composition in the preferred embodiment, the layers may have different compositions. For example, the outer coating layer 34 may not contain the inorganic hollow bodies and only the filling layers 35 may contain the inorganic hollow bodies.

The filling layers 35 extend between the end surfaces 29A and 29B of the honeycomb structured body 21 in the preferred embodiment. However, it is only required that the filling layers 35 be arranged at least in the vicinity of the upstream end surface 29A of the honeycomb structured body 21.

The filling layers 35 are arranged on the outer surface of the filter peripheral portion 21B at the 0-degree, about 90-degree, about 180-degree, and about 270-degree positions in the preferred embodiment. However, the positions at which the filling layers 35 are formed should not be limited to these positions. The positions at which the filling layers 35 are formed may be changed as necessary according to the diameter of the honeycomb structured body 21 or the number of the honeycomb members 22 that are bonded together. For example, the honeycomb structured body 21 may have a diameter of about 203 mm and may be formed by bonding thirty-two honeycomb members 22 as in a third modification shown in FIG. 9. In this case, the filling layers 35 may be arranged on the outer surface of the honeycomb structured body 21 at about 45-degree, about 135-degree, about 225-degree, and about 315-degree positions about the center X. In this example, the 0-degree position on the outer surface of the honeycomb structured body 21 is on an extension of the outer wall 26, which extends parallel to the direction P, of a first honeycomb member 22A that is adjacent to the center X.

The filling layers 35 may be unnecessary depending on the diameter of the honeycomb structured body 21 or the number of bonded honeycomb members 22. For example, the honeycomb structured body 21 may have a diameter of about 228 mm and may be formed by bonding forty-five honeycomb members 22 of the preferred embodiment as in a fourth modification shown in FIG. 10. In this case, the ratio of the vertical cross-sectional area S2 of each of all the honeycomb members 22B forming the filter peripheral portion 21B to the vertical cross-sectional area S0 of the honeycomb member 22A forming the filter core portion 21A is about 4% or more.

The second honeycomb members 22B may be formed from a material having a lower heat conductivity than the porous ceramic forming the first honeycomb members 22A. In this case, the heat insulation effect of the filter peripheral portion 21B increases. Heat is less likely to escape toward the casing 18. As a result, the temperature of the filter peripheral portion 21B may be prevented from decreasing. In this case, the PM removing efficiency of the honeycomb structured body tends to increase.

The honeycomb structured body of the preferred embodiment may be adapted to use in an exhaust gas purification device other than the spontaneous ignition type exhaust gas purification device. For example, the honeycomb structured body may be adapted to use in an exhaust gas purification device for removing PM with a heating means such as a heater or a burner. Further, the honeycomb structured body may be adapted to use in an exhaust gas purification device for a combustion apparatus other than an internal combustion engine. For example, the honeycomb structured body may be adapted to use in an exhaust gas purification for a boiler.

A honeycomb structured body having the structure described below is included in the scope of the present invention.

(1) A honeycomb structured body includes a plurality of honeycomb members, which are bonded together with a bonding material, and an outer surface formed by an outer coating layer. Each honeycomb member includes an outer wall, a partition arranged inward from the outer wall, and a plurality of cells partitioned by the partition and functioning as a flow passage for a fluid. The honeycomb structured body includes a filter core portion, which is formed by integrating a plurality of first honeycomb members in the plurality of honeycomb members that have a rectangular cross-section orthogonal to an axis of the honeycomb structured body, and a filter peripheral portion, which is arranged outside the filter core portion and formed by a plurality of second honeycomb members in the plurality of honeycomb members that have a cross-section shaped differently from a rectangular and is orthogonal to the axis. When an area of the cross-section of each first honeycomb member is represented by S0 and an area of the cross-section of each filling layer orthogonal to the axis is represented by S1, a ratio of the cross-sectional area S1 to the cross-sectional area S0 is less than about 4%. This structure contributes to enable each honeycomb member forming the filter peripheral portion to retain an amount of heat large enough to sufficiently remove PM captured on the partition and contributes to prevent the cells from being clogged by PM in an optimal manner.

(2) In the honeycomb structured body, the ratio of the cross-sectional area S1 to the cross-sectional area S0 is less than about 9%.

(3) The cross-section orthogonal to the axis is oval. The honeycomb structured body has, on the outer surface thereof, a 0-degree position that is on an extension of a minor axis drawn on a center of the honeycomb structured body, and an about 45-degree position, an about 135-degree position, an about 225-degree position, and an about 315-degree position that are respectively separated from the 0-degree position by about 45 degrees, about 135 degrees, about 225 degrees, and about 315 degrees. A plurality of filling layers are arranged at the about 45-degree position, the about 135-degree position, the about 225-degree position, and the about 315-degree position. This structure contributes to ensure that the honeycomb structured body having an oval cross-section sufficiently removes PM in its filter peripheral portion.

Test examples of the present invention and comparative examples will now be described.

<Manufacturing of the Honeycomb Structure>

Test Example 1

In test example 1, the honeycomb structured body 21 shown in FIGS. 2 and 6 was manufactured. First, 7000 part by weight of alpha silicon carbide particles having an average particle diameter of 10 μm and 3000 parts by weight of alpha silicon carbide particles having an average particle diameter of 0.5 μm were wet mixed. Then, 570 parts by weight of an organic binder (methyl cellulose) and 1770 parts by weight of water were added to 10000 parts by weight of the resulting mixture, which was kneaded to form a mixed composition. Then, 330 parts by weight of a reversible agent (UNILUB (registered trademark) manufactured by NOF CORPORATION) and 150 parts by weight of a lubricant agent (glycerin) were added to the mixed composition, which was kneaded and subjected to extraction to form an extruded body having a rectangular pillar shape shown in FIG. 3.

Next, the extruded body was dried using for example a microwave drier to obtain a ceramic dried body. A plug paste having the same composition as the extruded body was filled in the openings of predetermined cells. After the paste was dried using a drier, the ceramic dried body was degreased at 400° C. and was fired for three hours in an argon atmosphere at 2200° C. under normal pressure to obtain a honeycomb member 22 (FIG. 3) formed by a silicon carbide sintered body. This honeycomb member 22 has the dimensions of 34.3×34.3×150 mm (height×width×length), a porosity of 42%, an average porous diameter of 11 μm, a cell density of 240 cells per square inch (cpsi), and a cell partition thickness of 0.3 mm.

A bonding material paste having heat resistance was prepared separately. The bonding material paste is composed of 30 parts by weight of alumina fibers having an average fiber length of 20 μm and an average fiber diameter of 2 μm, 21 parts by weight of carbonaceous elementary particles having an average particle diameter of 0.6 μm, 15 parts by weight of silica sol, 5.6 parts by weight of carboxymethyl cellulose, and 28.4 parts by weight of water. The bonding paste has a viscosity of 30 Pa·s (at room temperature).

Spacers (space maintaining members) were prepared separately. Each spacer is a disk-shaped cardboard with a diameter of 5 mm and a thickness of 1 mm and has two surfaces on which a bonding material is applied.

Spacers were fixed to each honeycomb member 22 in a manner that one spacer was arranged on each corner of each of the side surfaces of the honeycomb member 22. Each spacer was fixed to the corresponding corner of the honeycomb member 22 at a position distant by 6.5 mm from each of the two sides that define the corner. Then, sixteen (4 by 4) honeycomb members 22 with the spacers were bonded into an aggregation S.

Next, the aggregation S was arranged in a paste supply chamber connected to a bonding paste supply apparatus. The paste supply chamber has the inner dimensions of 145×145×150 mm (height×width×length). The bonding material paste supply apparatus has three supply grooves formed at positions corresponding to the gaps between the honeycomb members 22 included in the aggregation S. Each supply groove has a width of 5 mm. Each supply groove communicates the inner surface of the paste supply chamber with the inner space of the bonding material paste supply apparatus. The paste supply chamber has a bottom plate, which opens and closes, at its end opposite to the end connected to the bonding material paste supply apparatus. This bottom plate was closed to come in contact with the end surface (29A or 29B) of the aggregation S to seal the gaps formed between the honeycomb members 22.

In this state, the bonding material paste was supplied into the paste supply chamber connected to the bonding material paste supply apparatus. The boding member paste was injected from the inner surface of the paste supply chamber to the side surface of the aggregation S under a pressure of 0.2 MPa, and was injected to the end surface of the aggregation S opposite to the end in contact with the bottom plate with a pressure of 0.05 MPa. In this way, the bonding material paste was filled in the gaps between the honeycomb members 22. The aggregation S was then dried for one hour at 100° C. to harden the bonding material paste. When the bonding material paste was hardened, the aggregation S was integrated together using the bonding material 24 having a thickness of 1 mm.

Next, 22.3 parts by weight of ceramic fibers formed by alumina silicate serving as inorganic fibers (shot content of 3%, average fiber length of 20 μm, and average fiber diameter of 6 μm), 30.2 parts by weight of silicon carbide particles having an average particle diameter of 0.3 μm as inorganic particles, 7 parts by weight of silica sol serving as an inorganic binder (with an $SiO_2$ content of 30 parts by weight in the sol), 0.5 parts by weight of carboxymethyl cellulose serving as an organic binder, and 39 parts by weight of water were mixed and kneaded to prepare a filling layer formation paste.

The filling layer formation paste was applied at four positions on the outer surface of the aggregation S. The aggregation S was then dried for one hour at 120° C. to harden the filling layer formation paste. As a result, the filling layers 35 were formed (refer to FIG. 5).

Next, the aggregation S was cut with a diamond cutter to form a cylindrical-shape honeycomb block having a diameter of 142 mm.

Next, 22.3 parts by weight of ceramic fibers formed by alumina silicate serving as inorganic fibers (shot content of 3%, average fiber length of 20 μm, and average fiber diameter of 6 μm), 30.2 parts by weight of silicon carbide particles having an average particle diameter of 0.3 μm serving as inorganic particles, 7 parts by weight of silica sol serving as an inorganic binder (with an $SiO_2$ content of 30 parts by weight in the sol), 0.5 parts by weight of carboxymethyl cellulose serving as an organic binder, and 39 parts by weight of water were mixed and kneaded to prepare an outer coating layer formation paste. In example 1, the outer coating layer formation paste has the same composition as the filling layer formation paste.

Next, the outer coating layer formation paste was applied to the outer surface of the honeycomb block. The honeycomb block was then dried for one hour at 120° C. to harden the outer coating layer formation paste. As a result, the outer coating layer 34 was formed. In this way, the cylindrical honeycomb structured body 21 having a diameter of 143 mm and a length of 150 mm was obtained. Table 1 shows the structure of the honeycomb structured body 21 of example 1 in detail.

Test Examples 2 to 10

As shown in FIGS. 2 and 6, 16 honeycomb members 22 manufactured in the same manner as in example 1 were bonded into a bundle, or an aggregation S. Filling layers 35 were arranged at predetermined positions of the aggregation S, and the aggregation S was cut to have a predetermined shape. As a result, a honeycomb structured body 21 having a circular vertical cross-section was obtained. Table 1 shows the structure of the honeycomb structured bodies 21 of examples 2 to 10 in detail.

Test Examples 11 to 13

Thirty-two honeycomb members 22 manufactured in the same manner as in example 1 were bonded into a bundle, or an aggregation S. Filling layers 35 were arranged at predetermined positions of the aggregation S, and the aggregation S was cut into predetermined shape. As a result, the honeycomb structured body 21 having a circular vertical cross-section was obtained (refer to FIG. 9). Table 1 shows the structure of this honeycomb structured body in detail.

Test Examples 14 and 15

Sixteen honeycomb members 22 manufactured in the same manner as in example 1 were bonded into a bundle, or an aggregation S. Filling layers 35 were arranged at predetermined positions of the aggregation S, and the aggregation S was cut into a predetermined shape. As a result, the honeycomb structured body 21 having an oval vertical cross-section was obtained (refer to FIG. 7). Table 1 shows the structure of this honeycomb structured body in detail.

Test Example 16

Sixteen (4 by 4) honeycomb members 22 manufactured in the same manner as in example 1 were bonded into a bundle, or an aggregation S. The aggregation S was cut with a diamond cutter to form a honeycomb block having a diameter of 142 mm including flat portions 32. The honeycomb block formed in example 16 underwent cutting before the filling layers were formed. Thus, this honeycomb block had an outer surface identical to the outer surface of the filter peripheral portion 21B shown in FIG. 2D.

Next, the honeycomb block was accommodated in a cylindrical jig having a diameter of 143 mm and a length of 150 mm. The jig was then arranged in a paste supply chamber connected to a bonding material paste supply apparatus. The jig has two semi-cylindrical components, which are made of a stainless (SUS), and the components of the jig are separable. The jig defines a gap of 1 mm with the curved outer surface of the honeycomb block. The bonding material paste supply apparatus has a plurality of nozzles at positions corresponding to the gap formed between the jig and the honeycomb block. A paste having the same composition as the outer coating layer formation paste of test example 1 was injected from the nozzles into the gap between the jig and the honeycomb block.

The honeycomb block accommodated in the jig was removed from the paste supply chamber and dried for one hour at 120° C. to harden the paste. In this way, the filling layers 35 and the outer coating layer 34 were formed simultaneously. As a result, the cylindrical-shape honeycomb structured body 21 having a diameter of 143 mm and a length of 150 mm was obtained. Table 1 shows the structure of the honeycomb structured body 21 of test example 16 in detail.

Test Example 17

A plurality of honeycomb members having rectangular pillar shapes (first honeycomb members 22A) and a plurality of honeycomb members having various irregular shape cross-sections (second honeycomb members 22B) were formed by extrusion in test example 17 although the aggregation was cut with a diamond cutter in test example 1. The composition of each honeycomb member is the same as in example 1. Extruded bodies of the second honeycomb members 22B having various irregular shape cross-sections are formed in the same manner as extruded bodies of the first honeycomb members 22A simply by using dies having desired shapes instead of a die used to form the extruded bodies of the first honeycomb members 22A. Refer to test example 1 for the drying and sintering processes of the extruded bodies.

The honeycomb members 22A and 22B were bonded using the bonding material 24 in the same manner as in example 1 to form a honeycomb block having a diameter of 142 mm including flat portions 32. The filling layers 35 and the outer coating layer 34 were formed simultaneously in the same manner as in example 16. Table 1 shows the structure of the honeycomb structured body 21 of test example 17 in detail.

Comparative Example 1

In comparative example 1, the honeycomb structured body was manufactured using 20 honeycomb members 22 as shown in FIG. 6. The honeycomb structured body of comparative example 1 does not include the filling layers 35 formed in test examples 1 to 10. Table 1 shows the structure of this honeycomb structured body in detail.

Comparative Example 2

Figure 9:
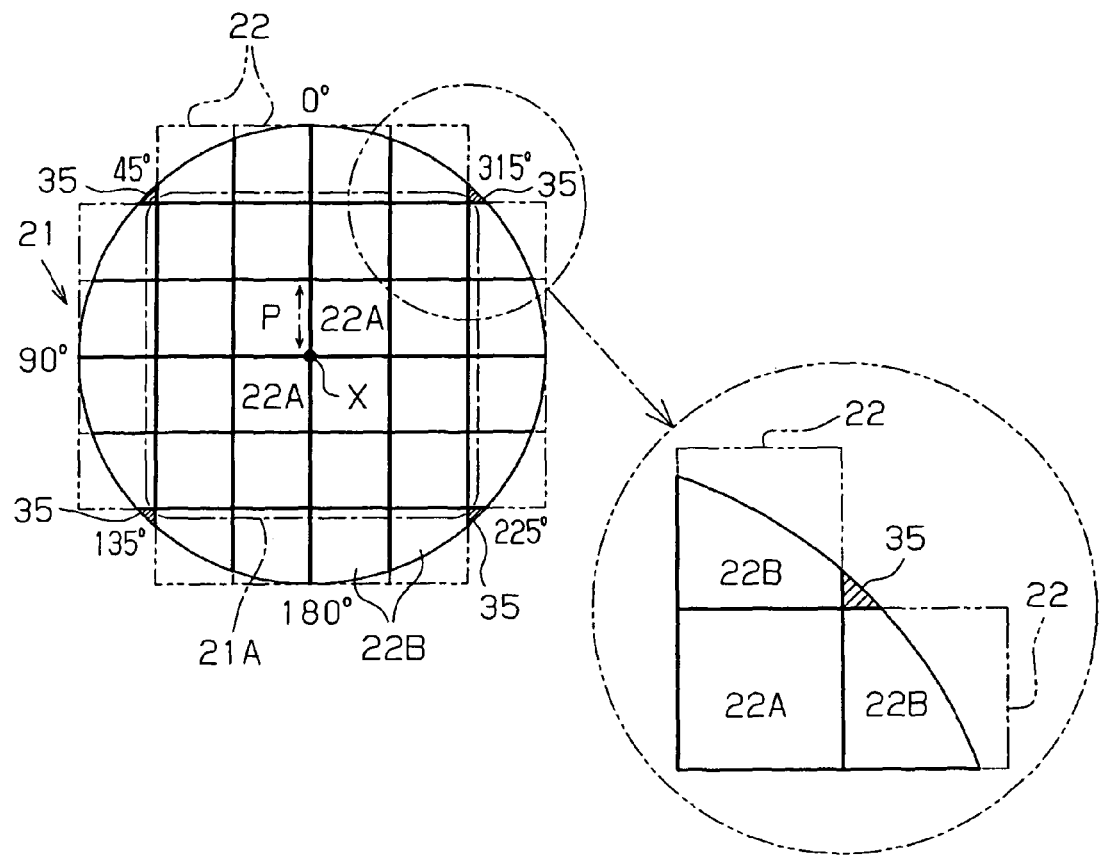
FIG. 9 is a schematic view of a honeycomb structured body according to a third modification.

In comparative example 2, the honeycomb structured body was manufactured using thirty-six honeycomb members 22 as shown in FIG. 9. The honeycomb structured body of comparative example 2 does not include the filling layers 35 of test examples 11 to 13. Table 1 shows the structure of this honeycomb structured body in detail.

Comparative Example 3

Figure 10:
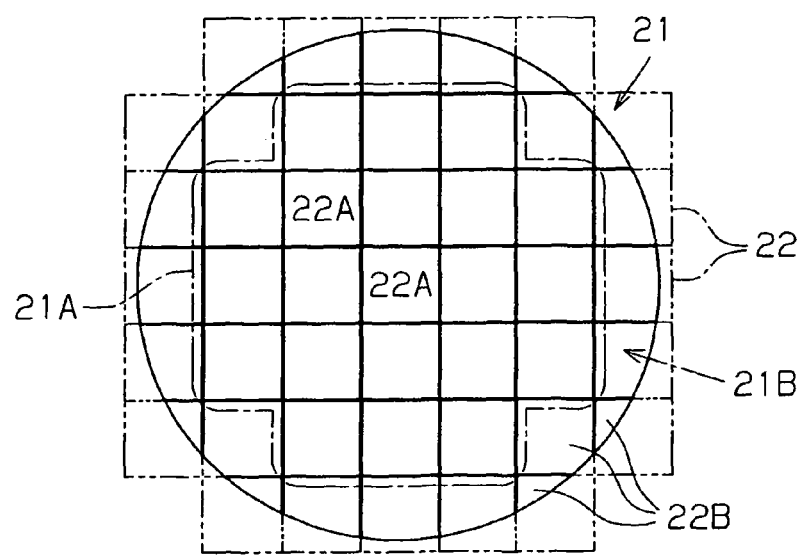
FIG. 10 is a schematic view of a honeycomb structured body according to a fourth modification.

As shown in FIG. 10, forty-five honeycomb members 22 were bonded into a bundle. The bundle of the honeycomb members 22 was then cut to obtain the honeycomb structured body having a circular vertical cross-section. The honeycomb structured body 21 of comparative example 3 includes honeycomb members 22B that need to be replaced by filling layers 35, that is, honeycomb members 22B having extremely small vertical cross-sectional areas, in its filter peripheral portion 21B. Table 1 shows the structure of this honeycomb structured body in detail.

Comparative Example 4

In the same manner as in test example 1, sixteen (4 by 4) honeycomb members 22 were bonded into an aggregation using a bonding material 24. Without forming the filling layers, the aggregation was cut with a diamond cutter to form a honeycomb block having a diameter of 142 mm including four flat portions 32 as shown in FIG. 2D. The outer coating layer formation paste used in test example 1 was applied to the outer surface of the honeycomb block. The thickness of the outer coating layer was adjusted to 0.5 mm using a rubber squeegee. As a result, the honeycomb structured body having four flat portions was formed. The honeycomb structured body of comparative example 4 has an outer surface substantially the same as the outer surface of the filter peripheral portion 21B shown in FIG. 2D.

Aggregation Dimensions: The dimension of the aggregation is expressed using the diameter ($\phi$)×the length (L).

Filling Layer Positions: Refer to FIG. 2A and FIG. 9 for the angular values used in test examples 1 to 13, 16, and 17 and comparative examples 1 to 4. Refer to FIG. 7 for the angular values used in test examples 14 and 15.

Vertical Cross-sectional Area of Second Honeycomb Member: The smallest value of the vertical cross-sectional areas of the second honeycomb members 22 forming the filter peripheral portion 21B is used. The values shown in Table 1 are in $cm^2$.

<Physical Evaluation of Filling Layer>

The filling layers 35 (in particular the inorganic fibers contained in the filling layers 35) arranged in the honeycomb structured bodies 21 of the test examples and comparative examples above were physically evaluated using the items below. Table 2 shows the results of the physical evaluation.

(1) Average Fiber Diameter of Inorganic Fibers: The average fiber diameter of 100 inorganic fibers randomly selected from a micrograph showing the cross-section of the filling layer 35 obtained using a scanning electron microscope was calculated.

(2) Average Fiber Length of Inorganic Fibers: The average fiber length of 100 inorganic fibers randomly selected from a micrograph showing the cross-section of the filling layer 35 obtained using a scanning electron microscope was calculated.

(3) Tap Density of Inorganic Fibers: The tap density was measured with a constant capacity measurement method according to JIS R 1628-1997 defining "the test methods for bulk density of fine ceramic powder". The entire contents of JIS R 1628-1997 are incorporated herein by reference.

<Evaluation Test of Honeycomb Structure>

(Evaluation 1: Clogging State)

Figure 11:
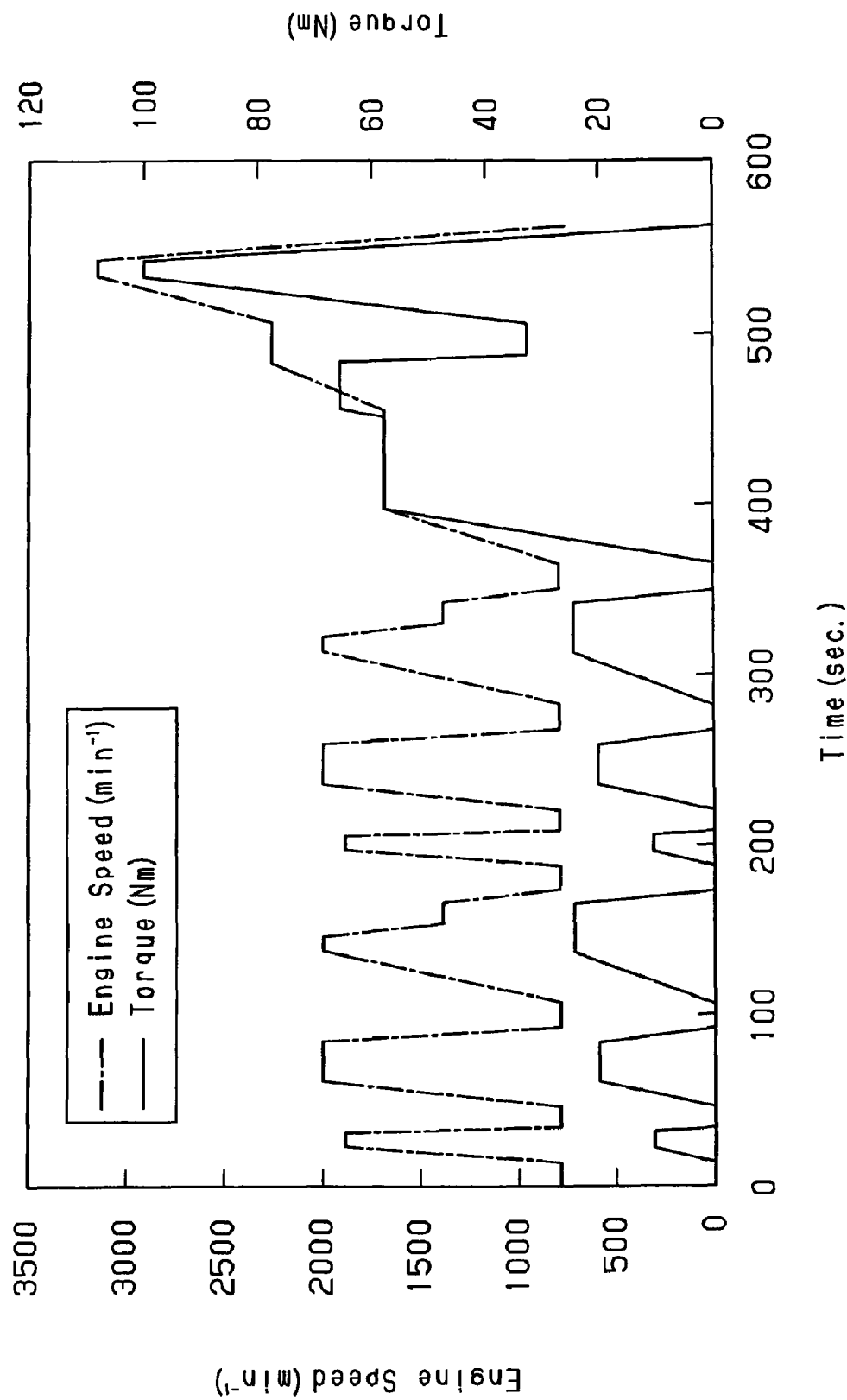
FIG. 11 is a graph showing test conditions used in an exhaust gas purification test.

An exhaust gas purification test of the honeycomb structured body 21 for each of the examples was conducted. The honeycomb structured body 21 was first set in the exhaust gas purification device 10. The engine was then driven for 600 seconds while the engine speed (revolution speed) and the torque of the engine were changed as shown in FIG. 11. After that, the same test was repeated until the cells 28 of the second honeycomb members 22B forming the filter peripheral portion 21B were clogged by PM. The number of times the test was repeated until the second honeycomb members 22B were clogged was recorded. The clogging state was then evaluated according to the criteria described below. Table 2 shows the results of this evaluation.

Symbol "○" indicates that no clogging was observed in the second honeycomb members after the purification test was repeated 150 times or more. Symbol "x" indicates that clogging was observed in the second honeycomb members when the purification test was repeated fifty times.

The clogging state is discussed in association with values of the ratio of to the vertical cross-sectional area S2 of the second honeycomb member 22B to the vertical cross-sectional area S0 of the first honeycomb member 22A (S2/S0).

(Evaluation 2: Durability of Filling Layer)

The state of the filling layers after the purification test of evaluation 1 was repeated 150 times was evaluated by visual inspection based on the criteria described below. Table 2 shows the results of this evaluation.

Symbol "○" indicates that no change was observed. Symbol "Δ" indicates that the filling layers cracked slightly. Symbol "x" indicates that the filling layers peeled off.

The durability of the filling layers is discussed in association with values of the ratio of the vertical cross-sectional area S of the filling layer 35 to the vertical cross-sectional area S0 of the first honeycomb member 22A (S1/S0) or in association with properties of the inorganic fibers contained in the filling layers. In Table 2, symbol "*" shows that the evaluation was not performed because the number of times the test was conducted until the second honeycomb members 22B were clogged was too small to correctly evaluate the durability of the filling layers.

For the honeycomb structured body of comparative example 4, the exhaust gas leaked during the measurements for evaluations 1 and 2. Thus, evaluations 1 and 2 were not performed for the honeycomb structured body of comparative example 4. A possible cause for the gas leakage is a gap between the four flat portions on the outer surface of the honeycomb structured body and the heat insulator 19 that was formed when the honeycomb structured body was set in the casing 18. The flat portions lower the supporting strength of the honeycomb structured body that is supported using the heat insulator 19. Thus, even when the honeycomb structured body is fastened tightly using the heat insulator 19, it is impossible to completely prevent the honeycomb structured body from moving or vibrating, or to prevent the gas from leaking from the honeycomb structured body. In this respect, the honeycomb structured bodies of test examples 1 to 17 without flat portions are prevented from having such movement, vibration, and gas leakage.

As shown in Table 2, for the honeycomb structured bodies of test examples 1 to 17, the value of S2/S0 is about 4% or more. No clogging was observed in the second honeycomb members 22 forming the filter peripheral portion 21B of these honeycomb structured bodies. This is considered to be because each second honeycomb member 22B forming the filter peripheral portion 21B was set to have a capacity (corresponding to the vertical cross-sectional area) for retaining an amount of heat large enough to sufficiently remove PM. For the honeycomb structured bodies of comparative examples 1 to 4, the value of S2/S0 is less than about 4%, and the filter peripheral portion 21B includes honeycomb members having extremely small vertical cross-sectional areas. Thus, such honeycomb members having extremely small vertical cross-sectional areas failed to sufficiently remove PM and caused their cells 28 to be clogged by the PM.

For the honeycomb structured bodies of test examples 1 to 5 and test examples 11 to 17, no change was observed in the state of the filling layers 35 after the cycle test. This is considered to be because the filling layers 35 containing the inorganic fibers having an average fiber diameter of about 1 to about 40 μm, an average fiber length of about 10 to about 200 μm, and a tap density of about 55 to about 65 g/$cm^3$ had sufficiently high heat resistance and sufficiently high strength, and thereby had high durability.

For the honeycomb structured bodies of test examples 7 to 10, the filling layers 35 cracked slightly. This is considered to be because the filling layers 35 did not contain inorganic fibers, or the inorganic fibers contained in the filling layers 35 failed to satisfy the above predetermined range for average fiber diameter, average fiber length, or the tap density of the inorganic fibers, and thereby had insufficiently high heat resistance and an insufficiently high strength. Further, for the honeycomb structured bodies of test examples 6 and 15, the filling layers 35 peeled off. This is considered to be because the value of S1/S0 was about 4% or more in the honeycomb structured bodies of test examples 6 and 15, and the filling layers 35 of these honeycomb structured bodies had extremely large vertical cross-sectional areas as compared with other test examples. In this case, the temperature of the filling layers 35 varied greatly and the internal heat stress of the filling layers 35 increased excessively during heating using the exhaust. As a result, the filling layers 35 peeled off. Further, the results of comparative example 14 reveal that the filling layers 35 have a sufficiently high durability when the value of S1/S0 is less than about 9%.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

TABLE 1

| | Aggregation dimensions($\phi \times L$) [mm] | Aggregation cross-section | Filling Layer | Carried Catalyst | Filling Layer Positions(°) | Aggregation cross-sectional area Sh |
|---|---|---|---|---|---|---|
| Test example 1 | 143 × 150 | Circular | Available | Available | 0, 90, 180, 270 | 160.606 |
| Test example 2 | 143 × 150 | Circular | Available | Available | 0, 90, 180, 270 | 160.606 |
| Test example 3 | 143 × 150 | Circular | Available | Available | 0, 90, 180, 270 | 160.606 |
| Test example 4 | 143 × 150 | Circular | Available | Available | 0, 90, 180, 270 | 160.606 |
| Test example 5 | 143 × 150 | Circular | Available | N/A | 0, 90, 180, 270 | 160.606 |
| Test example 6 | 143 × 150 | Circular | Available | Available | 0, 90, 180, 270 | 160.606 |
| Test example 7 | 143 × 150 | Circular | Available | Available | 0, 90, 180, 270 | 160.606 |
| Test example 8 | 143 × 150 | Circular | Available | Available | 0, 90, 180, 270 | 160.606 |
| Test example 9 | 143 × 150 | Circular | Available | Available | 0, 90, 180, 270 | 160.606 |
| Test example 10 | 143 × 150 | Circular | Available | Available | 0, 90, 180, 270 | 160.606 |
| Test example 11 | 203 × 150 | Circular | Available | Available | 45, 135, 225, 315 | 323.017 |
| Test example 12 | 203 × 150 | Circular | Available | Available | 45, 135, 225, 315 | 323.017 |
| Test example 13 | 203 × 150 | Circular | Available | N/A | 45, 135, 225, 315 | 323.017 |
| Test example 14 | 154.9 × 127 | Oval | Available | Available | 45, 135, 225, 315 | 154.506 |
| Test example 15 | 154.9 × 127 | Oval | Available | Available | 45, 135, 225, 315 | 154.506 |
| Test example 16 | 143 × 150 | Circular | Available | Available | 0, 90, 180, 270 | 160.606 |
| Test example 17 | 143 × 150 | Circular | Available | Available | 0, 90, 180, 270 | 160.606 |
| Comparative Example 1 | 143 × 150 | Circular | N/A | Available | — | 160.606 |
| Comparative Example 2 | 203 × 150 | Circular | N/A | Available | — | 323.017 |
| Comparative Example 3 | 228 × 300 | Circular | N/A | Available | — | 408.281 |
| Comparative Example 4 | 143 × 150 | Circular | N/A | Available | — | 160.606 |

| | 1st Honeycomb member cross-sectional area S0 | Filling layer cross-sectional area S1 | Vertical cross-sectional area of 2nd honeycomb member S2 | Cell density [cpsi] | Partition thickness [mm] |
|---|---|---|---|---|---|
| Test example 1 | 11.765 | 0.3 | 3.764 | 240 | 0.3 |
| Test example 2 | 11.765 | 0.9 | 4.556 | 240 | 0.3 |
| Test example 3 | 11.765 | 0.3 | 3.764 | 240 | 0.3 |
| Test example 4 | 11.765 | 0.3 | 3.764 | 240 | 0.3 |
| Test example 5 | 11.765 | 0.3 | 3.764 | 160 | 0.38 |
| Test example 6 | 11.765 | 1.5 | 3.279 | 240 | 0.3 |
| Test example 7 | 11.765 | 0.3 | 3.764 | 240 | 0.3 |
| Test example 8 | 11.765 | 0.3 | 3.764 | 240 | 0.3 |
| Test example 9 | 11.765 | 0.3 | 3.764 | 240 | 0.3 |
| Test example 10 | 11.765 | 0.3 | 3.764 | 240 | 0.3 |
| Test example 11 | 11.765 | 0.36 | 4.489 | 160 | 0.38 |
| Test example 12 | 11.765 | 0.49 | 4.562 | 160 | 0.38 |
| Test example 13 | 11.765 | 0.36 | 4.489 | 160 | 0.38 |
| Test example 14 | 11.765 | 1.05 | 2.17 | 160 | 0.38 |
| Test example 15 | 11.765 | 1.5 | 2.927 | 160 | 0.38 |

TABLE 1-continued

| | | | | | |
|---|---|---|---|---|---|
| Test example 16 | 11.765 | 0.3 | 3.764 | 240 | 0.3 |
| Test example 17 | 11.765 | 0.3 | 3.764 | 240 | 0.3 |
| Comparative Example 1 | 11.765 | — | 0.3 | 240 | 0.3 |
| Comparative Example 2 | 11.765 | — | 0.45 | 160 | 0.38 |
| Comparative Example 3 | 11.765 | — | 0.3 | 160 | 0.38 |
| Comparative Example 4 | 11.765 | — | 3.764 | 240 | 0.3 |

TABLE 2

| | S2/S0 [%] | S1/S0 [%] | Filling layer composition | Average fiber diameter [µm] | Average fiber length [µm] | Tap density [g/cm$^3$] | Evaluation 1 | Evaluation 2 |
|---|---|---|---|---|---|---|---|---|
| Test example 1 | 31.99 | 2.55 | Inorganic particles, inorganic fibers | 6 | 20 | 58 | ○ | ○ |
| Test example 2 | 38.73 | 7.65 | Inorganic particles, inorganic fibers | 6 | 20 | 58 | ○ | ○ |
| Test example 3 | 31.99 | 2.55 | Inorganic particles, inorganic hollow body | — | — | — | ○ | ○ |
| Test example 4 | 31.99 | 2.55 | Same as outer coating layer | 6 | 20 | 58 | ○ | ○ |
| Test example 5 | 31.99 | 2.55 | Inorganic particles, inorganic fibers | 6 | 20 | 58 | ○ | ○ |
| Test example 6 | 27.87 | 12.75 | Inorganic particles, inorganic fibers | 6 | 20 | 58 | ○ | x |
| Test example 7 | 31.99 | 2.55 | Inorganic particles | — | — | — | ○ | Δ |
| Test example 8 | 31.99 | 2.55 | Inorganic particles, inorganic fibers | 6 | 28 | 75 | ○ | Δ |
| Test example 9 | 31.99 | 2.55 | Inorganic particles, inorganic fibers | 50 | 200 | 36 | ○ | Δ |
| Test example 10 | 31.99 | 2.55 | Inorganic particles, inorganic fibers | 50 | 200 | 36 | ○ | Δ |
| Test example 11 | 38.16 | 3.06 | Inorganic particles, inorganic fibers | 6 | 20 | 58 | ○ | ○ |
| Test example 12 | 38.78 | 4.17 | Inorganic particles, inorganic fibers | 6 | 20 | 58 | ○ | ○ |
| Test example 13 | 38.16 | 3.06 | Inorganic particles, inorganic fibers | 6 | 20 | 58 | ○ | ○ |
| Test example 14 | 18.45 | 8.9 | Inorganic particles, inorganic fibers | 6 | 20 | 58 | ○ | ○ |
| Test example 15 | 24.88 | 12.75 | Inorganic particles, inorganic fibers | 6 | 20 | 58 | ○ | ○ |
| Test example 16 | 31.99 | 2.55 | Inorganic particles, inorganic fibers | 6 | 20 | 58 | ○ | ○ |
| Test example 17 | 31.99 | 2.55 | Inorganic particles, inorganic fibers | 6 | 20 | 58 | ○ | ○ |
| Comparative Example 1 | 2.55 | — | Inorganic particles, inorganic fibers | 6 | 20 | 58 | x | * |
| Comparative Example 2 | 3.82 | — | Inorganic particles, inorganic fibers | 6 | 20 | 58 | x | * |
| Comparative Example 3 | 2.54 | — | Inorganic particles, inorganic fibers | 6 | 20 | 58 | x | * |
| Comparative Example 4 | 31.99 | — | Inorganic particles, inorganic fibers | 6 | 20 | 58 | * | * |

What is claimed is:

1. A honeycomb structured body comprising:
a plurality of honeycomb members bonded together by a bonding material, each honeycomb member including an outer wall, a partition arranged inward from the outer wall, and a plurality of cells partitioned by the partition for functioning as a flow passage for a fluid; and an outer surface formed by an outer coating layer;
a filter core portion including a plurality of first honeycomb members of the plurality of honeycomb members, each of the first honeycomb members having a vertical cross-section that is orthogonal to an axis of the honeycomb structured body and rectangular;
a filter peripheral portion arranged outside the filter core portion and formed by a plurality of second honeycomb members of the plurality of honeycomb members, each of the second honeycomb members having a vertical cross-section that is orthogonal to the axis and irregular in shape, wherein an outer surface of the filter peripheral portion includes a flat portion defined by the outer wall of at least one honeycomb member; and a filling layer arranged on the flat portion in the outer surface of the filter peripheral portion that is not bonded to the outer wall of any one of the plurality of honeycomb members by the bonding material, the filling layer being sandwiched between the outer coating layer and the flat portion in the outer surface of the filter peripheral portion, the filling layer and the outer coating layer being dried and hardened.

2. The honeycomb structured body according to claim 1, wherein when representing a cross-sectional area of the vertical cross-section of each first honeycomb member with S0 and representing a cross-sectional area of a vertical cross-section of the filling layer orthogonal to the axis with S1, a ratio of the area S1 to the area S0 is less than about 4%.

3. The honeycomb structured body according to claim 1, wherein the filling layer is one of a plurality of filling layers arranged on the outer surface of the honeycomb structured body at equiangular intervals about the axis.

4. The honeycomb structured body according to claim 3, wherein the outer surface has a 0-degree position on an extension of the outer wall of one of the first honeycomb members that is adjacent to the center of the honeycomb structured body, and an about 90-degree position, an about 180-degree position, and an about 270-degree position that are respectively separated from the 0-degree position by about 90 degrees, about 180 degrees, and about 270 degrees about the center, wherein the filling layers are arranged at the 0-degree position, the about 90-degree position, the about 180-degree position, and the about 270-degree position.

5. The honeycomb structured body according to claim 3, further comprising:
a peripheral surface extending parallel to the axis, and the peripheral surface includes a 0-degree position on an extension of the outer wall of one of the first honeycomb members that is adjacent to the center of the honeycomb structured body, and an about 45-degree position, an about 135-degree position, an about 225-degree position, and an about 315-degree position that are respectively separated from the 0-degree position by about 45 degrees, about 135 degrees, about 225 degrees, and about 315 degrees about the center, wherein the filling layers are arranged at the about 45-degree position, the about 135-degree position, about the 225-degree position, and the about 315-degree position.

6. The honeycomb structured body according to claim 1, wherein the filling layer is arranged in part of the outer surface to extend between end surfaces of the honeycomb structured body along the axis.

7. The honeycomb structured body according to claim 1, wherein the filling layer contains inorganic particles.

8. The honeycomb structured body according to claim 1, wherein the filling layer contains either one of inorganic fibers and inorganic hollow bodies.

9. The honeycomb structured body according to claim 8, wherein the inorganic fibers have an average fiber diameter of about 1 to about 40 μm and an average fiber length of about 10 to about 200 μm.

10. The honeycomb structured body according to claim 9, wherein the inorganic fibers have an average fiber diameter of about 6 to about 40 μm.

11. The honeycomb structured body according to claim 8, wherein the inorganic fibers have a tap density of about 55 to about 65 g/cm$^3$.

12. The honeycomb structured body according to claim 1, wherein the filling layer has a composition identical to that of the outer coating layer.

13. The honeycomb structured body according to claim 1, wherein each honeycomb member has a cell density of about 200 to about 300 cells per square inch.

14. The honeycomb structured body according to claim 1, wherein the partition has a thickness of about 0.33 mm or less.

15. The honeycomb structured body according to claim 1, wherein the vertical cross-section orthogonal to the axis is circular or oval.

16. The honeycomb structured body according to claim 1, further comprising a catalyst carried by the partition.

17. The honeycomb structured body according to claim 1, wherein each of the honeycomb members is formed mainly from porous ceramic.

18. The honeycomb structured body according to claim 17, further comprising a plurality of first plugs for sealing upstream openings of half of the plurality of cells and a plurality of second plugs for sealing downstream openings of the remaining half of the plurality of cells, and wherein the first and second plugs have the same composition as the honeycomb members.

19. A method for manufacturing a honeycomb structured body, the method comprising:
an aggregation formation step configured to bond a plurality of honeycomb members into an aggregation with a bonding material, wherein each honeycomb member has an outer wall, a partition arranged inward from the outer wall, and a plurality of cells partitioned by the partition for functioning as a flow passage for a fluid, and wherein the aggregation including a filter core portion including a plurality of first honeycomb members of the plurality of honeycomb members and a filter peripheral portion arranged outside the filter core portion and formed by a plurality of second honeycomb members of the plurality of honeycomb members, each of the first honeycomb members having a vertical cross-section that is orthogonal to an axis of the honeycomb structured body and rectangular, each of the second honeycomb members having a vertical cross-section that is orthogonal to the axis and irregular in shape, wherein an outer surface of the filter peripheral portion includes a flat portion defined by the outer wall of at least one honeycomb member;
a filling layer formation step configured to arrange a filling layer on the flat portion in the outer surface of the filter peripheral portion that is not bonded to the outer wall of any one of the plurality of honeycomb members by the bonding material;
an outer coating layer formation step configured to form an outer coating layer on the outer surface of the aggregation to sandwich the filling layer between the outer coating layer and the flat portion in the outer surface of the filter peripheral portion; and
a drying step configured to dry and harden the filling layer and the outer coating layer.

20. The method according to claim 19, further comprising a cutting step configured to cut the outer surface of the aggregation.

21. The method according to claim 20, wherein the aggregation formation step, the filling layer formation step, the cutting step, and the outer coating layer formation step are performed in this order.

22. The method according to claim 20, wherein the filling layer formation step and the outer coating layer formation step are performed after the aggregation formation step and the cutting step are performed.

23. The method according to claim 22, wherein the filling layer formation step and the outer coating layer formation step are performed simultaneously.

24. The method according to claim 19, wherein when each of the honeycomb members is formed into a predetermined shape in advance, the filling layer formation step and the outer coating layer formation step are performed after the aggregation formation step is performed.

25. The method according to claim 24, wherein the filling layer formation step and the outer coating layer formation step are simultaneously performed.

26. The method according to claim 19, wherein the aggregation includes a filter core portion including a plurality of first honeycomb members in the plurality of honeycomb members, each of the first honeycomb members having a vertical cross-section that is orthogonal to an axis of the honeycomb structured body and rectangular; and a filter peripheral portion arranged outside the filter core portion and formed by a plurality of second honeycomb members in the plurality of honeycomb members, each of the second honeycomb members having a vertical cross-section that is orthogonal to the axis and irregular in shape;

the method further comprising the step configured to form the second honeycomb members by cutting some of the plurality of honeycomb members before the aggregation formation step, wherein the aggregation formation step includes forming the filter core portion and forming the filter peripheral portion around the filter core portion.

27. The honeycomb structured body according to claim 1, wherein the filter peripheral portion includes an outer surface having projections and recessions that are formed through a cutting process, the outer coating layer fills the recessions and covers the recessions and projections of the outer surface of the filter peripheral portion, a side wall having no recessions and projections is covered by the filling layer, and the filling layer is covered by the outer coating layer.

28. The honeycomb structured body according to claim 1, wherein the outer coating layer is formed after forming the filling layer.

29. The honeycomb structured body according to claim 1, wherein the outer coating layer and the filling layer are simultaneously formed.

30. The honeycomb structured body according to claim 1, wherein the filling layer is subjected to cutting.

31. The honeycomb structured body according to claim 1, wherein the filling layer is selectively filled in parts of the filter peripheral portion that are recessed from a hypothetical contour line of the filter peripheral portion.

32. The honeycomb structured body according to claim 1, wherein the honeycomb structured body is adapted to use in a spontaneous ignition type vehicle exhaust gas purification device.

* * * * *